United States Patent
Beber et al.

(10) Patent No.: US 10,427,316 B2
(45) Date of Patent: *Oct. 1, 2019

(54) FOOD PROCESSOR WITH ADJUSTABLE BLADE ASSEMBLY

(71) Applicant: WHIRLPOOL CORPORATION, Benton Harbor, MI (US)

(72) Inventors: Kevin James Beber, Granger, IN (US); Jeremy T. Wolters, Stevensville, MI (US); Eric G. Tauzer, Charlevoix, MI (US); Joao Paulo M. Goncalves, Midland, MI (US); Alex R. Oliveira, Lauro de Freitas (BR); Fernando R. Oliveira, Lauro de Freitas (BR)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,040

(22) Filed: Dec. 6, 2016

(65) Prior Publication Data

US 2017/0080591 A1 Mar. 23, 2017

Related U.S. Application Data

(60) Continuation of application No. 14/220,203, filed on Mar. 20, 2014, now Pat. No. 10,105,864, which is a
(Continued)

(51) Int. Cl.
*A47J 43/046* (2006.01)
*B26D 7/26* (2006.01)
(Continued)

(52) U.S. Cl.
CPC .......... *B26D 7/2628* (2013.01); *A47J 43/046* (2013.01); *A47J 43/0722* (2013.01); *B26D 1/29* (2013.01); *B26D 7/01* (2013.01)

(58) Field of Classification Search
CPC ....... A47J 43/0722; A47J 43/046; B26D 1/29; B26D 7/2628; B26D 7/01
(Continued)

(56) References Cited

U.S. PATENT DOCUMENTS

| 1,489,695 A | 4/1924 | Burns et al. |
|---|---|---|
| 1,628,941 A | 5/1927 | White |

(Continued)

FOREIGN PATENT DOCUMENTS

| CN | 1115128 C | 7/2003 |
|---|---|---|
| CN | 1575716 A | 2/2005 |

(Continued)

OTHER PUBLICATIONS

Wolfgang Puck Professional Series 12-Cup Food Processor Use and Care, Jul. 3, 2007, 46 pages.
(Continued)

*Primary Examiner* — Phuong T Nguyen
(74) *Attorney, Agent, or Firm* — Price Heneveld LLP

(57) ABSTRACT

A food processor includes a bowl with a removable lid. Food items are advanced into the bowl through a feed tube formed in the lid where they are cut by a blade assembly. A rotating disk is adjustable relative to the blade assembly to vary the thickness of the food items cut by the blade assembly.

18 Claims, 22 Drawing Sheets

Related U.S. Application Data division of application No. 12/769,746, filed on Apr. 29, 2010, now Pat. No. 8,720,325.

(51) Int. Cl.
*A47J 43/07* (2006.01)
*B26D 1/29* (2006.01)
*B26D 7/01* (2006.01)

(58) Field of Classification Search
USPC .... 99/538, 537, 348; 241/92, 100, 286, 277, 241/282.1, 282.2, 37.5, 278.1; 83/932, 83/168, 857, 666, 676
See application file for complete search history.

(56) References Cited

U.S. PATENT DOCUMENTS

| | | |
|---|---|---|
| 1,826,242 A | 10/1931 | Dehuff |
| 2,001,036 A | 5/1935 | Prince |
| 2,070,545 A | 2/1937 | Gilbert |
| 2,074,162 A | 3/1937 | Bowman |
| 2,146,710 A | 2/1939 | Bloomfield |
| 2,189,199 A | 2/1940 | Criner |
| 2,284,155 A | 5/1942 | Landgraf |
| 2,304,476 A | 12/1942 | Poplawski |
| 2,305,288 A | 12/1942 | Cavalleri |
| 2,409,067 A | 10/1946 | Reed |
| 2,480,717 A | 8/1949 | Dodegge |
| 2,510,934 A | 6/1950 | Schildknecht |
| 2,530,455 A | 11/1950 | Forss |
| 2,537,852 A | 1/1951 | Peterson |
| 2,585,255 A | 2/1952 | Kochner et al. |
| 2,664,002 A | 12/1953 | Anderson |
| 2,710,098 A | 6/1955 | Tilton |
| 2,722,114 A | 11/1955 | Kochner |
| D176,257 S | 12/1955 | Hill et al. |
| 2,733,052 A | 1/1956 | Luther |
| 2,794,627 A | 6/1957 | Rodwick |
| D181,541 S | 11/1957 | Madl et al. |
| 2,867,420 A | 1/1959 | Pots |
| 2,905,452 A | 9/1959 | Appleton |
| D187,684 S | 4/1960 | Hauser et al. |
| 2,946,299 A | 7/1960 | Clifford |
| 2,992,715 A | 7/1961 | Blachly |
| 3,171,636 A | 3/1965 | Barlow et al. |
| 3,176,968 A | 4/1965 | Appleton |
| 3,180,627 A | 4/1965 | Belonga |
| 3,199,860 A | 8/1965 | Moberg |
| 3,220,450 A | 11/1965 | Aronson, II et al. |
| 3,373,975 A | 3/1968 | Congdon |
| 3,493,215 A | 2/1970 | Edwards et al. |
| 3,502,848 A | 3/1970 | Fink |
| 3,542,238 A | 11/1970 | Uhl |
| 3,550,657 A | 12/1970 | Swanke |
| 3,612,126 A | 10/1971 | Emmons et al. |
| 3,623,525 A | 11/1971 | Kieves |
| 3,635,147 A | 1/1972 | Lee |
| 3,704,736 A | 12/1972 | Pratley |
| 3,738,616 A | 6/1973 | Copeland et al. |
| 3,783,727 A | 1/1974 | Brignard et al. |
| 3,784,118 A | 1/1974 | Hurwitz |
| 3,881,705 A | 6/1975 | Greenspan |
| 3,901,484 A | 8/1975 | Ernster |
| 3,960,369 A | 6/1976 | Sommer |
| 4,078,481 A | 3/1978 | Wunderlin |
| 4,087,053 A | 5/1978 | Voglesonger |
| 4,108,054 A | 8/1978 | Klocker et al. |
| 4,137,834 A | 2/1979 | Uibel |
| 4,190,208 A | 2/1980 | Schaeffer et al. |
| 4,213,569 A | 7/1980 | Amiot |
| 4,216,917 A | 8/1980 | Clare et al. |
| 4,234,605 A | 11/1980 | Takeuchi |
| 4,277,181 A | 7/1981 | Stahly et al. |
| 4,283,979 A | 8/1981 | Rakocy et al. |
| 4,337,000 A | 6/1982 | Lehmann |
| 4,362,219 A | 12/1982 | Carlsson |
| 4,364,525 A | 12/1982 | McClean |
| 4,369,680 A | 1/1983 | Williams |
| 4,371,118 A | 2/1983 | Sontheimer et al. |
| 4,417,506 A | 11/1983 | Herbst et al. |
| 4,429,624 A | 2/1984 | Linn |
| 4,487,509 A | 12/1984 | Boyce |
| 4,512,522 A | 4/1985 | Williams |
| 4,560,111 A | 12/1985 | Cavalli |
| 4,570,519 A | 2/1986 | Motosko, II |
| 4,624,166 A | 11/1986 | Kreth et al. |
| D287,327 S | 12/1986 | Cavalli |
| 4,629,131 A | 12/1986 | Podell |
| 4,649,810 A | 3/1987 | Wong |
| 4,674,690 A | 6/1987 | Ponikwia et al. |
| 4,688,478 A | 8/1987 | Williams |
| 4,693,610 A | 9/1987 | Weiss |
| 4,706,896 A | 11/1987 | Moon-Kau |
| 4,714,203 A | 12/1987 | Williams |
| 4,733,589 A | 3/1988 | Wolff |
| D295,012 S | 4/1988 | Gelber |
| 4,802,407 A | 2/1989 | Negri et al. |
| 4,817,512 A | 4/1989 | Vangen |
| 4,818,116 A | 4/1989 | Pardo |
| 4,819,882 A | 4/1989 | Stottmann et al. |
| 4,820,054 A | 4/1989 | Wong |
| 4,854,717 A | 8/1989 | Crane et al. |
| 4,877,191 A | 10/1989 | Aktiengesellschaft |
| 4,878,627 A | 11/1989 | Otto |
| 4,883,144 A | 11/1989 | Haushalter et al. |
| 4,931,345 A | 6/1990 | Böttger et al. |
| 4,938,125 A | 7/1990 | Wong |
| 4,942,807 A | 7/1990 | Wong |
| D310,153 S | 8/1990 | Kaiser |
| 4,959,256 A | 9/1990 | Piera |
| 4,959,517 A | 9/1990 | Jump et al. |
| 4,984,512 A | 1/1991 | Takahashi et al. |
| 4,998,677 A | 3/1991 | Gallaher |
| 5,009,510 A | 4/1991 | Pardo |
| 5,022,315 A | 6/1991 | Bertram et al. |
| 5,031,518 A | 7/1991 | Bordes |
| 5,037,033 A | 8/1991 | Stottmann et al. |
| 5,041,324 A | 8/1991 | Siegling et al. |
| D319,950 S | 9/1991 | Maass |
| 5,046,252 A | 9/1991 | Ayuta et al. |
| D320,716 S | 10/1991 | Maass |
| 5,054,383 A | 10/1991 | Cho |
| D322,193 S | 12/1991 | Maass |
| 5,071,077 A | 12/1991 | Arroubi et al. |
| 5,074,201 A | 12/1991 | Takeyama et al. |
| 5,166,480 A | 11/1992 | Böttger et al. |
| 5,174,403 A | 12/1992 | Geiger |
| 5,197,681 A | 3/1993 | Liebermann |
| 5,228,381 A | 7/1993 | Virgilio et al. |
| D339,715 S | 9/1993 | Barrault |
| 5,272,961 A | 12/1993 | Campbell et al. |
| 5,289,760 A | 3/1994 | Barradas |
| D347,144 S | 5/1994 | Brady |
| 5,329,069 A | 7/1994 | Amsel et al. |
| 5,363,746 A | 11/1994 | Gordon |
| 5,402,710 A | 4/1995 | Chen |
| 5,463,937 A | 11/1995 | Belongia et al. |
| 5,469,782 A | 11/1995 | Wong |
| 5,486,665 A | 1/1996 | Le Rouzic |
| 5,493,955 A | 2/1996 | Belongia et al. |
| 5,513,557 A | 5/1996 | Chiang |
| 5,533,797 A | 7/1996 | Gelber |
| 5,549,386 A | 8/1996 | Pardo et al. |
| 5,567,049 A | 10/1996 | Beaudet et al. |
| 5,577,430 A | 11/1996 | Gunderson et al. |
| D381,553 S | 7/1997 | Candianides |
| D387,948 S | 12/1997 | Leverrier |
| D390,416 S | 2/1998 | Hippen et al. |
| 5,749,285 A | 5/1998 | Dörner et al. |
| D394,986 S | 6/1998 | Lallemand |
| 5,758,963 A | 6/1998 | Xie et al. |
| 5,768,978 A | 6/1998 | Dörner et al. |
| 5,771,784 A | 6/1998 | Sham |
| D396,990 S | 8/1998 | Leverrier |

(56) References Cited

U.S. PATENT DOCUMENTS

| | | |
|---|---|---|
| 5,794,524 A | 8/1998 | Kemker et al. |
| 5,799,567 A | 9/1998 | Dörner |
| 5,816,136 A | 10/1998 | Stallings |
| 5,819,636 A | 10/1998 | Khashoggi |
| 5,823,675 A | 10/1998 | Myerly |
| 5,839,356 A | 11/1998 | Dornbush et al. |
| 5,852,968 A | 12/1998 | Sundquist |
| D404,244 S | 1/1999 | Jozancy |
| 5,893,319 A | 4/1999 | Bois |
| 5,957,577 A | 9/1999 | Dickson et al. |
| 6,019,238 A | 2/2000 | Kindig et al. |
| 6,026,735 A | 2/2000 | Waterworth |
| 6,035,563 A | 3/2000 | Hoefer et al. |
| 6,035,766 A | 3/2000 | Schirmer |
| D424,865 S | 5/2000 | Crescenzi et al. |
| 6,065,861 A | 5/2000 | Chen |
| D427,016 S | 6/2000 | Kindig et al. |
| 6,113,966 A | 9/2000 | Belongia et al. |
| D423,864 S | 10/2000 | Kingdig et al. |
| 6,164,196 A | 12/2000 | Deschamps et al. |
| 6,188,046 B1 | 2/2001 | Barrow |
| 6,192,790 B1 | 2/2001 | Balandier |
| 6,193,181 B1 | 2/2001 | Astegno et al. |
| 6,230,612 B1 | 5/2001 | Rossi |
| D444,995 S | 7/2001 | Thackray |
| 6,254,019 B1 | 7/2001 | Galbreath |
| 6,259,068 B1 | 7/2001 | Barrow |
| 6,289,793 B1 | 9/2001 | Hu et al. |
| 6,315,226 B1 | 11/2001 | Trick et al. |
| 6,318,247 B1 | 11/2001 | Di Nunzio et al. |
| 6,321,641 B1 | 11/2001 | Wang |
| 6,350,053 B1 | 2/2002 | Morin |
| 6,373,031 B1 | 4/2002 | Barrow |
| 6,382,454 B1 | 5/2002 | Buffard et al. |
| D466,761 S | 12/2002 | Baerenrodt et al. |
| 6,527,433 B2 | 3/2003 | Daniels, Jr. |
| 6,550,372 B1 | 4/2003 | Sharples |
| 6,551,693 B1 | 4/2003 | Buffard et al. |
| 6,517,908 B1 | 6/2003 | Bohannon et al. |
| 6,572,254 B1 | 6/2003 | Marriere et al. |
| 6,596,380 B1 | 7/2003 | Buffard et al. |
| 6,609,455 B2 | 8/2003 | Fouquet |
| 6,616,324 B1 | 9/2003 | Planca et al. |
| 6,632,013 B2 | 10/2003 | Wulf et al. |
| 6,637,381 B2 | 10/2003 | Planca et al. |
| 6,640,692 B1 | 11/2003 | Hilgers |
| D484,357 S | 12/2003 | Seum et al. |
| 6,655,264 B2 | 12/2003 | Rossi |
| 6,669,359 B1 | 12/2003 | Ancona et al. |
| D488,344 S | 4/2004 | Seum et al. |
| D488,957 S | 4/2004 | Holderfield et al. |
| 6,715,706 B1 | 4/2004 | Planca et al. |
| 6,726,353 B1 | 4/2004 | Beaudet et al. |
| 6,761,326 B2 | 7/2004 | Astegno et al. |
| 6,786,141 B2 | 9/2004 | Tompa et al. |
| 6,805,312 B2 | 10/2004 | Capp |
| 6,823,772 B2 | 11/2004 | Payen et al. |
| 6,845,707 B1 | 1/2005 | Xu et al. |
| D502,047 S | 2/2005 | Ledingham et al. |
| D502,842 S | 3/2005 | Hallar |
| 6,966,698 B2 | 11/2005 | Daniels, Jr. |
| 7,018,091 B2 | 3/2006 | Arroubi et al. |
| D519,314 S | 4/2006 | Blaise |
| 7,034,477 B2 | 4/2006 | Herrada et al. |
| D520,808 S | 5/2006 | Beesley et al. |
| 7,063,009 B2 | 6/2006 | Lin |
| 7,069,838 B2 | 7/2006 | Payen |
| D526,531 S | 8/2006 | Drees et al. |
| D528,363 S | 9/2006 | Ulanski et al. |
| D528,364 S | 9/2006 | Kolar et al. |
| D530,565 S | 10/2006 | Grcic |
| D533,395 S | 12/2006 | Drees et al. |
| D547,601 S | 7/2007 | Ting et al. |
| 7,270,156 B2 | 9/2007 | Beesley et al. |
| D552,412 S | 10/2007 | Steiner |
| D557,976 S | 12/2007 | Olson et al. |
| 7,314,308 B2 | 1/2008 | Fallowes et al. |
| 7,318,666 B1 | 1/2008 | Lin |
| 7,322,112 B2 | 1/2008 | Boerner |
| 7,325,479 B2 | 2/2008 | Laigneau et al. |
| 7,328,864 B2 | 2/2008 | Narai et al. |
| 7,339,142 B2 | 3/2008 | Pessayre et al. |
| 7,371,003 B2 | 5/2008 | Hamelin |
| D577,257 S | 9/2008 | Kuan |
| D577,537 S | 9/2008 | Lee |
| D578,341 S | 10/2008 | Picozza et al. |
| 7,461,589 B2 | 12/2008 | Sinton |
| 7,481,154 B2 | 1/2009 | Murat et al. |
| D587,064 S | 2/2009 | Mark |
| 7,487,715 B2 | 2/2009 | Rossi |
| 7,488,515 B2 | 2/2009 | Groll |
| 7,495,196 B2 | 2/2009 | Groll |
| D587,526 S | 3/2009 | Barnard et al. |
| D588,406 S | 3/2009 | Ulanski |
| 7,520,663 B1 | 4/2009 | Kolar et al. |
| D592,447 S | 5/2009 | Blaise |
| D594,697 S | 6/2009 | Lavy |
| D595,087 S | 6/2009 | Metaxatos et al. |
| 7,566,472 B2 | 7/2009 | Coudurier |
| 7,598,464 B2 | 10/2009 | Deng |
| 7,617,766 B2 | 11/2009 | Tracy et al. |
| D605,462 S | 12/2009 | Picozza et al. |
| 7,624,674 B2 | 12/2009 | Chameroy et al. |
| 7,648,264 B2 | 1/2010 | Breviere et al. |
| 7,669,521 B2 | 3/2010 | Cartigny et al. |
| 7,681,817 B2 | 3/2010 | Orent |
| 7,694,615 B2 | 4/2010 | Dipietro |
| D616,244 S | 5/2010 | Thai et al. |
| D617,136 S | 6/2010 | Bock et al. |
| 7,753,223 B2 | 7/2010 | Boozer et al. |
| D621,656 S | 8/2010 | Ulanski et al. |
| 7,775,705 B2 | 8/2010 | Kozlowski et al. |
| 7,780,337 B2 | 8/2010 | Peng |
| 7,800,022 B2 | 9/2010 | Kim |
| 7,827,906 B1 | 11/2010 | Carter |
| 7,833,637 B2 | 11/2010 | Tuffe et al. |
| D631,282 S | 1/2011 | Ferraby |
| 7,878,702 B2 | 2/2011 | Peng |
| 7,878,703 B2 | 2/2011 | Stephens et al. |
| D637,862 S | 5/2011 | Fouquet |
| D637,870 S | 5/2011 | Bock |
| 7,959,347 B2 | 6/2011 | Pryor, Jr. et al. |
| D642,858 S | 8/2011 | Lazzer |
| 7,993,054 B2 | 8/2011 | Wulf et al. |
| 7,993,694 B2 | 8/2011 | Goderiaux et al. |
| D644,478 S | 9/2011 | Czach |
| D644,480 S | 9/2011 | Czach et al. |
| 8,042,990 B2 | 10/2011 | Pryor, Jr. et al. |
| 8,070,010 B2 | 12/2011 | Coudurier |
| 8,087,603 B2 | 1/2012 | Kolar et al. |
| 8,122,815 B2 | 2/2012 | Wolfe |
| 8,122,821 B2 | 2/2012 | Sands |
| 8,152,083 B2 | 4/2012 | Bower et al. |
| 8,161,867 B2 | 4/2012 | Dutertre et al. |
| D662,359 S | 6/2012 | Boozer et al. |
| 8,210,737 B2 | 7/2012 | Wong |
| 8,227,072 B2 | 7/2012 | Le Bris et al. |
| D667,683 S | 9/2012 | Czach et al. |
| 8,287,180 B2 | 10/2012 | Kolar et al. |
| D670,531 S | 11/2012 | Carlson |
| 8,372,496 B2 | 2/2013 | Le Bris et al. |
| 8,403,555 B2 | 3/2013 | Wu |
| D683,180 S | 5/2013 | Carlson |
| 8,438,971 B1 | 5/2013 | Thurley |
| 8,499,963 B2 | 8/2013 | Muller et al. |
| 8,501,289 B2 | 8/2013 | Le Bris et al. |
| 8,529,120 B2 | 9/2013 | Ulanski |
| 8,544,381 B2 | 10/2013 | Cartigny et al. |
| D694,572 S | 12/2013 | Kobos et al. |
| D694,573 S | 12/2013 | Norland et al. |
| D694,574 S | 12/2013 | Norland et al. |
| D694,582 S | 12/2013 | Norland |
| D694,583 S | 12/2013 | Norland |
| 8,640,606 B2 | 2/2014 | Wolfe |

(56) References Cited

U.S. PATENT DOCUMENTS

| | | |
|---|---|---|
| 8,647,735 B2 | 2/2014 | Le Bris et al. |
| D702,993 S | 4/2014 | Lownds |
| 8,745,904 B2 | 6/2014 | Paccaud |
| 8,752,481 B2 | 6/2014 | Williams et al. |
| D711,682 S | 8/2014 | Norland et al. |
| 8,814,011 B2 | 8/2014 | Ulanski |
| 8,887,628 B2 | 11/2014 | Cai |
| RE45,308 E | 12/2014 | Kolar et al. |
| 8,901,942 B2 | 12/2014 | Fergen et al. |
| 8,985,488 B2 | 3/2015 | Hidalgo Garcia et al. |
| D731,234 S | 6/2015 | Weaden et al. |
| D731,236 S | 6/2015 | Yin |
| 9,049,967 B1 | 6/2015 | Golino et al. |
| RE45,655 E | 8/2015 | Kolar et al. |
| D739,679 S | 9/2015 | Benoit et al. |
| 9,149,065 B2 | 10/2015 | Hoare et al. |
| 9,198,540 B2 | 12/2015 | Carlson |
| D747,135 S | 1/2016 | Ha |
| D755,004 S | 5/2016 | Bock et al. |
| 9,380,913 B2 | 7/2016 | Golino |
| 9,474,417 B1 | 10/2016 | Pryor, Jr. et al. |
| D770,226 S | 11/2016 | McConnell et al. |
| D772,008 S | 11/2016 | McConnell et al. |
| D772,009 S | 11/2016 | McConnell et al. |
| 9,500,235 B2 | 11/2016 | Kanning |
| 9,545,175 B2 | 1/2017 | Audette |
| D782,247 S | 3/2017 | Kim et al. |
| D783,356 S | 4/2017 | Kim et al. |
| 9,635,981 B2 | 5/2017 | Barnard et al. |
| D798,109 S | 8/2017 | Ulanski et al. |
| 9,750,372 B2 | 9/2017 | Foxlee et al. |
| 9,775,467 B2 | 10/2017 | Sapire |
| 9,855,535 B2 | 1/2018 | Arnett et al. |
| 2001/0032856 A1 | 10/2001 | Casey |
| 2002/0181322 A1 | 12/2002 | Brunswick et al. |
| 2003/0081498 A1 | 5/2003 | Buchsteiner |
| 2004/0001387 A1 | 1/2004 | Hallar et al. |
| 2004/0065211 A1 | 4/2004 | McNair |
| 2004/0145965 A1 | 7/2004 | Chan et al. |
| 2004/0146621 A1 | 7/2004 | Kennedy et al. |
| 2005/0058018 A1 | 3/2005 | Hooper et al. |
| 2005/0120888 A1 | 6/2005 | Wang |
| 2005/0152215 A1 | 7/2005 | Stuart et al. |
| 2005/0257692 A1 | 11/2005 | Marcato |
| 2006/0044935 A1 | 3/2006 | Benelli et al. |
| 2006/0075872 A1 | 4/2006 | Wangler |
| 2006/0117961 A1 | 6/2006 | Guo |
| 2006/0150791 A1 | 7/2006 | Chase et al. |
| 2006/0163396 A1 | 7/2006 | Kennedy et al. |
| 2006/0254429 A1 | 11/2006 | Sinton |
| 2006/0286255 A1 | 12/2006 | Xu et al. |
| 2007/0044621 A1 | 3/2007 | Rite et al. |
| 2007/0051249 A1* | 3/2007 | Obersteiner ........ A47J 43/0722 99/348 |
| 2007/0209528 A1 | 9/2007 | Change |
| 2007/0261523 A1 | 11/2007 | Hussey et al. |
| 2008/0115677 A1 | 5/2008 | Tseng |
| 2008/0156913 A1 | 7/2008 | Orent |
| 2008/0163768 A1 | 7/2008 | Glucksman et al. |
| 2008/0213447 A1 | 9/2008 | Payen et al. |
| 2008/0271609 A1 | 11/2008 | Pahl et al. |
| 2008/0298172 A1 | 12/2008 | Krasznai |
| 2009/0090254 A1 | 4/2009 | Herren |
| 2009/0120301 A1 | 5/2009 | Severnak |
| 2009/0139383 A1 | 6/2009 | Tsai |
| 2009/0158941 A1 | 6/2009 | Lee |
| 2009/0260523 A1 | 10/2009 | Peng |
| 2009/0301319 A1 | 12/2009 | Bigge et al. |
| 2009/0310436 A1 | 12/2009 | Huang et al. |
| 2009/0314168 A1 | 12/2009 | Krasznai |
| 2010/0012639 A1 | 1/2010 | Merrell et al. |
| 2010/0028514 A1 | 2/2010 | Goderiaux et al. |
| 2010/0107893 A1 | 5/2010 | Goodrick-Meech |
| 2010/0116145 A1 | 5/2010 | Tracy et al. |
| 2010/0147160 A1 | 6/2010 | Oochi |
| 2010/0256804 A1 | 10/2010 | Freeman |
| 2010/0308142 A1 | 12/2010 | Krasznai et al. |
| 2011/0014342 A1 | 1/2011 | Picozza et al. |
| 2011/0017750 A1 | 1/2011 | Fortkamp |
| 2011/0063941 A1 | 3/2011 | Seidler et al. |
| 2011/0139017 A1 | 6/2011 | Beber et al. |
| 2011/0185917 A1 | 8/2011 | Goderiaux et al. |
| 2011/0188340 A1 | 8/2011 | Kolar et al. |
| 2011/0214574 A1 | 9/2011 | Chang |
| 2011/0232506 A1 | 9/2011 | Cai |
| 2011/0248108 A1 | 10/2011 | Carriere |
| 2011/0265664 A1 | 11/2011 | Goncalves et al. |
| 2012/0042786 A1 | 2/2012 | Fedell |
| 2012/0138716 A1 | 6/2012 | Taguchi et al. |
| 2012/0181363 A1 | 7/2012 | Huang |
| 2012/0286080 A1 | 11/2012 | Sladecek |
| 2013/0003490 A1 | 1/2013 | Kemker et al. |
| 2013/0032038 A1 | 2/2013 | Lee et al. |
| 2013/0074700 A1 | 3/2013 | Cheung |
| 2013/0149444 A1 | 6/2013 | Le Bris et al. |
| 2013/0233181 A1 | 9/2013 | Allen et al. |
| 2013/0327232 A1 | 12/2013 | Charles et al. |
| 2013/0334349 A1 | 12/2013 | Carden |
| 2014/0102951 A1 | 4/2014 | Riha et al. |
| 2014/0134305 A1 | 5/2014 | Wolfe |
| 2014/0217211 A1 | 8/2014 | Sanford |
| 2014/0263340 A1 | 9/2014 | Audette |
| 2014/0299691 A1 | 10/2014 | Zakowski |
| 2015/0000534 A1 | 1/2015 | Hager et al. |
| 2015/0014227 A1 | 1/2015 | Riha, IV et al. |
| 2015/0098299 A1 | 4/2015 | Sapire |
| 2015/0201787 A1 | 7/2015 | Holzbauer et al. |
| 2015/0238042 A1 | 8/2015 | Tonelli et al. |
| 2015/0282672 A1 | 10/2015 | Baker |
| 2016/0035335 A1 | 2/2016 | Kolar et al. |
| 2016/0256839 A1 | 9/2016 | Dickson, Jr. et al. |
| 2016/0287011 A1 | 10/2016 | Deshayes et al. |
| 2016/0287018 A1 | 10/2016 | Thomas et al. |
| 2016/0296899 A1 | 10/2016 | Hoare et al. |
| 2016/0331182 A1 | 11/2016 | Golino |
| 2017/0086623 A1 | 3/2017 | Lee |
| 2017/0340169 A1 | 11/2017 | Brunner |
| 2018/0116466 A1 | 5/2018 | Pilch et al. |

FOREIGN PATENT DOCUMENTS

| | | |
|---|---|---|
| CN | 1656989 A | 8/2005 |
| CN | 201101452 Y | 8/2008 |
| CN | 101496699 B | 12/2011 |
| DE | 2111667 5 A1 | 10/1971 |
| DE | 3644267 A1 | 7/1988 |
| DE | 4414824 | 11/1995 |
| DE | 4414825 | 11/1995 |
| DE | 10226939 | 1/2003 |
| DE | 10226940 | 1/2003 |
| DE | 10210442 | 9/2003 |
| DE | 202004012729 U1 | 2/2005 |
| DE | 102005028758 | 1/2007 |
| DE | 102008038783 | 2/2010 |
| DE | 202010012730 U1 | 12/2010 |
| DE | 102009055795 | 5/2011 |
| DE | 202011050875 | 12/2012 |
| DE | 102012104639 | 1/2013 |
| DE | 102012101775 | 9/2013 |
| EP | 0100755 A2 | 2/1984 |
| EP | 0244016 A1 | 11/1987 |
| EP | 0248490 | 12/1987 |
| EP | 0350380 | 1/1990 |
| EP | 0556467 | 8/1993 |
| EP | 0432615 | 2/1994 |
| EP | 0584140 | 3/1994 |
| EP | 0699409 | 3/1996 |
| EP | 0723756 | 7/1996 |
| EP | 0893087 A1 | 1/1999 |
| EP | 0949878 | 10/1999 |
| EP | 0963726 | 12/1999 |
| EP | 0966909 | 12/1999 |
| EP | 1430824 A1 | 6/2004 |
| EP | 1472962 | 11/2004 |

(56) References Cited

FOREIGN PATENT DOCUMENTS

| | | |
|---|---|---|
| EP | 1479947 A1 | 11/2004 |
| EP | 1566130 | 8/2005 |
| EP | 1616514 | 1/2006 |
| EP | 1647217 | 4/2006 |
| EP | 1731068 | 12/2006 |
| EP | 1483996 | 10/2007 |
| EP | 1922960 | 5/2008 |
| EP | 2071989 | 6/2009 |
| EP | 2134221 | 12/2009 |
| EP | 2269491 A1 | 1/2011 |
| EP | 2326220 | 6/2011 |
| EP | 2237710 | 7/2011 |
| EP | 2240054 | 7/2011 |
| EP | 2355681 | 8/2011 |
| EP | 2359696 | 8/2011 |
| EP | 2368470 | 9/2011 |
| EP | 2394547 | 12/2011 |
| EP | 2427088 | 3/2012 |
| EP | 2429363 | 3/2012 |
| EP | 2434933 | 4/2012 |
| EP | 2508110 A1 | 10/2012 |
| EP | 2522261 | 11/2012 |
| EP | 2529650 | 12/2012 |
| EP | 2594175 | 5/2013 |
| EP | 2633791 | 9/2013 |
| EP | 2637519 | 9/2013 |
| EP | 2640236 | 9/2013 |
| EP | 3146875 A1 | 3/2017 |
| FR | 2447703 | 8/1980 |
| FR | 2500737 A1 | 9/1982 |
| FR | 2578159 | 9/1986 |
| FR | 2582497 | 12/1986 |
| FR | 2602660 A1 | 2/1988 |
| FR | 2646074 A1 | 10/1990 |
| FR | 2862199 A1 | 5/2005 |
| FR | 2939238 A1 | 6/2010 |
| GB | 1264448 | 2/1972 |
| GB | 2075626 A | 11/1981 |
| GB | 2196238 | 4/1988 |
| JP | 1153123 A | 6/1989 |
| JP | 1299522 A | 12/1989 |
| JP | 4099551 A | 3/1992 |
| JP | 4099552 A | 3/1992 |
| KR | 20090011969 U | 11/2009 |
| WO | 9107862 | 5/1991 |
| WO | 9220269 | 11/1992 |
| WO | 9529614 | 11/1995 |
| WO | 9529615 | 11/1995 |
| WO | 9529617 | 11/1995 |
| WO | 9917648 | 4/1999 |
| WO | 20000019878 A1 | 4/2000 |
| WO | 0174174 | 10/2001 |
| WO | 0221986 A1 | 3/2002 |
| WO | 200230253 A1 | 4/2002 |
| WO | 03057355 A1 | 7/2003 |
| WO | 2003057355 A1 | 7/2003 |
| WO | 2002037036 | 4/2005 |
| WO | 20060128221 A1 | 12/2006 |
| WO | 2008027255 | 3/2008 |
| WO | 2008142284 | 11/2008 |
| WO | 2009076585 A1 | 6/2009 |
| WO | 2010067030 | 6/2010 |
| WO | 2010128256 | 11/2010 |
| WO | 2011007242 | 1/2011 |
| WO | 2012062988 | 5/2012 |
| WO | 2012113106 A1 | 8/2012 |
| WO | 2012113107 A1 | 8/2012 |
| WO | 2012113125 A1 | 8/2012 |
| WO | 2012159530 | 11/2012 |
| WO | 2013041466 | 3/2013 |
| WO | 2013045819 | 4/2013 |
| WO | 2013120145 A1 | 8/2013 |
| WO | 2013131731 | 9/2013 |
| WO | 2013140056 | 9/2013 |
| WO | 2013167839 | 11/2013 |

OTHER PUBLICATIONS

European Search Report, Application No. 11163932.4, dated Jul. 28, 2011, 6 pages.

European Search Report, Application No. 11163931.6, dated Aug. 19, 2011, 7 pages.

Ellie; Home Cooking in Montana: Product Review . . . Cuisinart Elite 12 cup Food Processor Model FP-12DC; Mar. 30, 2012; 6 pages.

* cited by examiner

FOOD PROCESSOR WITH ADJUSTABLE BLADE ASSEMBLY

CROSS-REFERENCE TO RELATED U.S. PATENT APPLICATIONS

The present application is a continuation of U.S. patent application Ser. No. 14/220,203 now U.S. Pat. No. 10,105,864, entitled "FOOD PROCESSOR WITH A LOCKABLE ADJUSTABLE BLADE ASSEMBLY," filed Mar. 20, 2014 which is a divisional application of U.S. patent application Ser. No. 12/769,746 now U.S. Pat. No. 8,720,325 entitled "FOOD PROCESSOR WITH A LOCKABLE ADJUSTABLE BLADE ASSEMBLY," filed Apr. 29, 2010, the entire disclosures of which are incorporated herein by reference.

Cross-reference is made to U.S. Utility patent application Ser. No. 12/769,709, now U.S. Pat. No. 8,985,010, entitled "Food Processor With Cutting Blade Assembly Support," filed Apr. 29, 2010, and U.S. Utility patent application Ser. No. 12/769,796, now U.S. Pat. No. 8,439,285, entitled "Adjustable Food Processor With Guide Ramp," filed Apr. 29, 2010, each of which is assigned to the same assignee as the present application, each of which is filed concurrently herewith, and each of which is hereby incorporated by reference.

FIELD OF THE INVENTION

The present disclosure relates generally to a domestic food processor, and more particularly to a food processor having a control for adjusting the cutting thickness of the food processor.

BACKGROUND OF THE INVENTION

A food processor is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that pieces of food cut by the blade fall through the aperture and collect in the bottom of the bowl.

SUMMARY OF THE INVENTION

According to one aspect of this disclosure, a food processor includes a base having a motor positioned therein, a removable bowl coupled to the base, and a removable lid coupled to the bowl. The lid has a feed tube that opens into the bowl. A cutting blade is positioned in the bowl and driven by the motor to cut food items advanced through the feed tube. The food processor also includes a rotating disk upwardly and downwardly movable relative to the cutting blade to adjust the distance therebetween, and a user-operated pin positioned below the rotating disk. The user-operated pin is movable between a first position in which the rotating disk is prevented from moving upwardly and downwardly relative to the cutting blade, and a second position in which the rotating disk is permitted to move upwardly and downwardly relative to the cutting blade. In some embodiments, the rotating disk may include a sleeve extending downwardly from a lower surface thereof, and the cutting blade may be coupled to a central shaft positioned in the sleeve of the rotating disk.

In some embodiments, the user-operated pin may include a pin body extending from a first end through a sidewall of the sleeve to a second end received in an aperture formed in the central shaft. In some embodiments, the sidewall of the sleeve may include a first plurality of teeth, an outer surface of the pin body may have a second plurality of teeth extending therefrom, and a number of the first plurality of teeth may be engaged with the second plurality of teeth when the user-operated pin is in the first position.

Additionally, in some embodiments, the first plurality of teeth may be spaced apart from the second plurality of teeth when the user-operated pin is moved to the second position. In some embodiments, the food processor may also include a spring having a first spring end positioned at a bottom of the aperture of the central shaft and a second spring end coupled to the second end of the user-operated pin. The spring may bias the user-operated pin in the first position. In some embodiments, a guide pin may extend outwardly from the bottom of the aperture, and the spring may extend over the guide pin.

In some embodiments, the food processor may also include a lever pivotably coupled to a sidewall of the sleeve and may have a first lever end contacting the second end of the user-operated pin. Movement of the user-operated pin between the first position and the second position may cause the lever to pivot about an axis between a first lever position and a second lever position. In some embodiments, the lever may extend from the first lever end to a second lever end. The second lever end may be coupled with the central shaft when the lever is at the first lever position. In some embodiments, the central shaft may have an outer surface with a plurality of teeth extending therefrom, and the second lever end may be engaged with a number of the plurality of teeth when the lever is at the first lever position, thereby preventing the rotating disk from moving relative to the cutting blade.

In some embodiments, the second lever end may be spaced apart from the plurality of teeth at the second lever position, thereby permitting movement of the rotating disk relative to the cutting blade. In some embodiments, the food processor may also include a spring having a first end coupled to a sidewall of the sleeve and a second end coupled to the second lever end. The spring may bias the lever in the first lever position, thereby maintaining the user-operated pin in the first position and preventing movement of the rotating disk relative to the cutting blade. Additionally, in some embodiments, a button may be secured to a first end of the user-operated pin, and depressing the button moves the user-operated pin from the first position to the second position.

According to another aspect, a food slicer assembly for a food processor is disclosed. The food slicer assembly includes a cutting blade, a rotating disk upwardly and downwardly movable relative to the cutting blade to adjust the distance therebetween, and a locking mechanism positioned below a lower surface of the rotating disk. The locking mechanism includes a user-operated pin that is movable between a first position in which the locking mechanism prevents the rotating disk from moving upwardly and downwardly relative to the cutting blade, and a second position in which the locking mechanism permits the rotating disk to move upwardly and downwardly relative to the cutting blade.

In some embodiments, the food slicer assembly may further include a sleeve extending downwardly from the lower surface of the rotating disk, and a central shaft positioned in the sleeve. The central shaft may have the cutting blade coupled thereto. In some embodiments, the locking mechanism may include a first plurality of teeth extending from a sidewall of the sleeve. The user-operated pin may extend through the sleeve into the central shaft and may have a second plurality of teeth extending therefrom. The second plurality of teeth may be engaged with a number of the first plurality of teeth when the user-operated pin is in the first position and spaced apart from the first plurality of teeth when the user-operated pin is moved to the second position.

In some embodiments, the locking mechanism may include a plurality of teeth extending from the central shaft, and a lever extending from a first end coupled to the user-operated pin to a second end. The second end of the lever may be engaged with a number of the teeth when the user-operated pin is in the first position and spaced apart from the plurality of teeth when the user-operated pin is in the second position. In some embodiments, the lever may be pivotably coupled to the sleeve.

According to another aspect, the food processor includes a base having a motor positioned therein, a removable bowl coupled to the base, a cutting blade positioned in the bowl and secured to a central shaft driven by the motor, and a rotating disk having the central shaft extending therethrough. The rotating disk is upwardly and downwardly movable between a plurality of positions relative to the cutting blade. The food processor also includes a locking mechanism positioned below a lower surface of the rotating disk. The locking mechanism includes a user-operated pin extending through the rotating disk that is movable between a first position in which the rotating disk is prevented from moving upwardly and downwardly relative to the cutting blade, and a second position in which the rotating disk is permitted to move upwardly and downwardly relative to the cutting blade.

In some embodiments, the locking mechanism may include a first plurality of teeth extending from a sidewall of the rotating disk, and the user-operated pin may have a second plurality of teeth extending therefrom. The second plurality of teeth may be engaged with a number of the first plurality of teeth when user-operated pin is in the first position and spaced apart from the first plurality of teeth when the user-operated pin is moved to the second position.

According to another aspect of this disclosure, a food processor includes a base having a motor positioned therein, a removable bowl coupled to the base, and a removable lid coupled to the bowl so as to define a processing chamber. The lid has a feed tube that opens into the bowl. The food processor also includes a blade assembly positioned in the processing chamber and driven by the motor, and the blade assembly has a flange extending therefrom. A rotating disk is movably coupled to the blade assembly, and the rotating disk has a plurality of slots formed therein. Each of the slots is sized to receive the flange of the blade assembly. The rotating disk is movable relative to the blade assembly between a plurality of cutting positions to produce cut food items of varying thicknesses, and the flange of the blade assembly is received into one of the plurality of slots at each of the plurality of cutting positions.

In some embodiments, the rotating disk may include a blade support pivotably coupled to an outer rim of the rotating disk. The plurality of slots may be formed in the blade support. In some embodiments, the blade support may be movable between a first position where the flange of the blade assembly is received in one of the plurality of slots, and a second position where the flange of the blade assembly is spaced apart from each of the plurality of slots. Additionally, in some embodiments, the rotating disk may be prevented from moving relative to the blade assembly when the blade support is placed in the first position, and the rotating disk may be permitted to move relative to the blade assembly when the blade support is placed in the second position.

In some embodiments, the outer rim of the rotating disk may have an opening defined therein, and the blade support may have a body positioned in the opening when the blade support is placed in the first position. The body of the blade support may extend outwardly from the opening when the blade support is placed in the second position.

In some embodiments, the rotating disk may include a locking device configured to maintain the blade support in the first position. In some embodiments, the locking device may include a tab extending from the blade support, and the tab may be received in a recess formed in the outer rim of the rotating disk when the blade support is placed in the first position.

In some embodiments, the plurality of slots may include at least five slots. Additionally, in some embodiments, the blade assembly may include a cutting blade secured to a mounting arm extending from a central shaft. In some embodiments, the flange of the blade assembly received in one of the plurality of slots may be an outer edge of the cutting blade when the rotating disk is placed at a first cutting position, and the flange of the blade assembly received in one of the plurality of slots may be an arcuate lip of the mounting arm when the rotating disk is placed at a second cutting position.

According to another aspect, a food slicer assembly for a food processor is disclosed. The food slicer assembly includes a cutting blade having an outer edge, and a rotating disk movable to a plurality of positions relative to the cutting blade to adjust the distance therebetween. The rotating disk has an outer rim positioned adjacent to the outer edge of the cutting blade, and a blade support coupled to the outer rim, the blade support includes a plurality of slots, each of which is sized to receive the outer edge of the cutting blade. The outer edge of the cutting blade is received in a first slot at a first position of the rotating disk.

In some embodiments, the food slicer assembly may further include a central shaft secured to an inner edge of the cutting blade, and a mounting arm secured to the central shaft and positioned below the cutting blade. In some embodiments, the mounting arm may have an arcuate lip extending parallel to the outer edge of the cutting blade. The lip may be received in the first slot of the blade support at a second position of the rotating disk.

In some embodiments, the blade support may include a body extending from a first end, and the first end may be hinged to the outer rim of the rotating disk such that the blade support is rotatable about a vertical axis. In some embodiments, when the rotating disk is at the first position, the outer edge of the cutting blade may be received in the first slot when the blade support is placed at a first position about the vertical axis, and the outer edge of the cutting blade may be spaced apart from each of the plurality of slots when the blade support is placed at a second position about the vertical axis.

Additionally, the first end of the body of the blade support may be coupled to the outer rim of the rotating disk via a pivot joint. The pivot joint may have the vertical axis extending therethrough.

According to another aspect, a food processor includes a base having a motor positioned therein, a removable bowl coupled to the base, a removable lid coupled to the bowl. The lid has a feed tube that opens into the bowl. A blade assembly is positioned in the bowl and is driven by the motor, and a rotating disk is movable between a plurality of cutting positions relative to the blade assembly. The rotating disk has a blade support that includes a slot corresponding to each of the plurality of cutting positions, each slot being sized to receive a flange of the blade assembly.

In some embodiments, the blade assembly may include a cutting blade having an outer edge. The rotating disk may have an outer rim positioned adjacent to the outer edge of the cutting blade, and the blade support may be pivotably coupled to the outer rim. In some embodiments, the blade support may be pivotable between a first position where the outer edge of the cutting blade is received in one slot of the blade support, and a second position where the outer edge of the cutting blade may be spaced apart from the blade support.

In some embodiments, the flange of the blade assembly received in one of the plurality of slots may be the outer edge of the cutting blade when the rotating disk is placed at a first cutting position.

According to another aspect of the disclosure, a food processing device is disclosed. The food processing device includes a base having a motor positioned therein, a removable bowl coupled to the base, and a removable lid coupled to the bowl so as to define a processing chamber. The lid has a feed tube that opens into the bowl. The food processing device also includes a blade assembly positioned in the processing chamber, which is driven by the motor and includes a cutting blade to cut food items advanced through the feed tube, and a rotating disk upwardly and downwardly movable relative to the cutting blade to adjust the distance between an upper surface of the rotating disk and the cutting blade. The food processing device also includes an adjustment assembly operable to move the rotating disk relative to the cutting blade. The adjustment assembly includes a control knob coupled to the blade assembly and is positioned above the upper surface of the rotating disk, and a threaded sleeve coupled to the rotating disk and is positioned in the control knob.

In some embodiments, the rotating disk may divide the processing chamber into an upper compartment and a lower compartment, and the blade assembly may include a mounting arm having a ramp defined therein to guide food items from the upper compartment to the lower compartment. In some embodiments, the ramp may have an inclined surface extending outwardly in a radial direction from a first end to a second end.

The inclined surface may have a first angle of inclination at the first end and a second angle of inclination at the second end. In some embodiments, the first angle of inclination may be greater than or equal to the second angle of inclination. Additionally, in some embodiments, the first angle of inclination may be approximately 25 degrees. In some embodiments, the second angle of inclination may be approximately 15 degrees.

In some embodiments, the rotating disk may have a counterweight secured thereto, and the threaded sleeve may be positioned between the mounting arm and the counterweight. In some embodiments, rotation of the control knob in a first direction may cause upward movement of the rotating disk, and rotation of the control knob in a second direction may cause downward movement of the rotating disk.

In some embodiments, the blade assembly may include a central shaft coupled to the control knob, and the central shaft may be received in the threaded sleeve. Rotation of the control knob may cause the threaded sleeve to move upwardly and downwardly along the central shaft.

According to another aspect, a food slicer assembly for a food processor is disclosed. The food slicer assembly includes a cutting blade, a mounting arm, which has a ramp defined therein, that is positioned below the cutting blade, and a rotating disk movable to a plurality of positions relative to the cutting blade to adjust the distance between its upper surface and the cutting blade. An adjustment assembly is operable to move the rotating disk relative to the cutting blade. The adjustment assembly includes an internally-threaded control knob positioned above the upper surface of the rotating disk, and an externally-threaded sleeve coupled to the rotating disk that is positioned in the control knob.

In some embodiments, the food slicer assembly may further include a central shaft that is coupled at an upper end to the control knob and is positioned in the sleeve. The mounting arm may extend outwardly from a first end secured to the central shaft to a second end positioned adjacent to an outer rim of the rotating disk. In some embodiments, the ramp may have an inclined surface extending in a radial direction from the first end of the mounting arm to the second end of the mounting arm. The inclined surface may have a first angle of inclination at the first end that is greater than or equal to a second angle of inclination at the second end. In some embodiments, the rotating disk may include a counterweight, and the sleeve may be positioned between the counterweight and the mounting arm.

According to another aspect, a food processor includes a base having a motor positioned therein, a removable bowl coupled to the base, and a removable lid coupled to the bowl so as to define a processing chamber. The lid has a feed tube that opens into the bowl. A cutting blade is positioned in the bowl and driven by the motor to cut food items advanced through the feed tube. A rotating disk is upwardly and downwardly movable relative to the cutting blade to adjust the distance therebetween. The rotating disk divides the processing chamber into an upper compartment and a lower compartment. A ramp is positioned below the cutting blade to guide food items from the upper compartment into the lower compartment. The food processor further includes an adjustment assembly operable to move the rotating disk relative to the cutting blade. The adjustment assembly includes a user-operated control device positioned above the rotating disk.

In some embodiments, the adjustment assembly may include an externally-threaded sleeve coupled to the rotating disk, and the user-operated control device may include an internally-threaded control knob having a grip.

BRIEF DESCRIPTION OF THE DRAWINGS

The detailed description particularly refers to the following figures, in which.

DETAILED DESCRIPTION OF THE PREFERRED EMBODIMENTS

Figure 1:
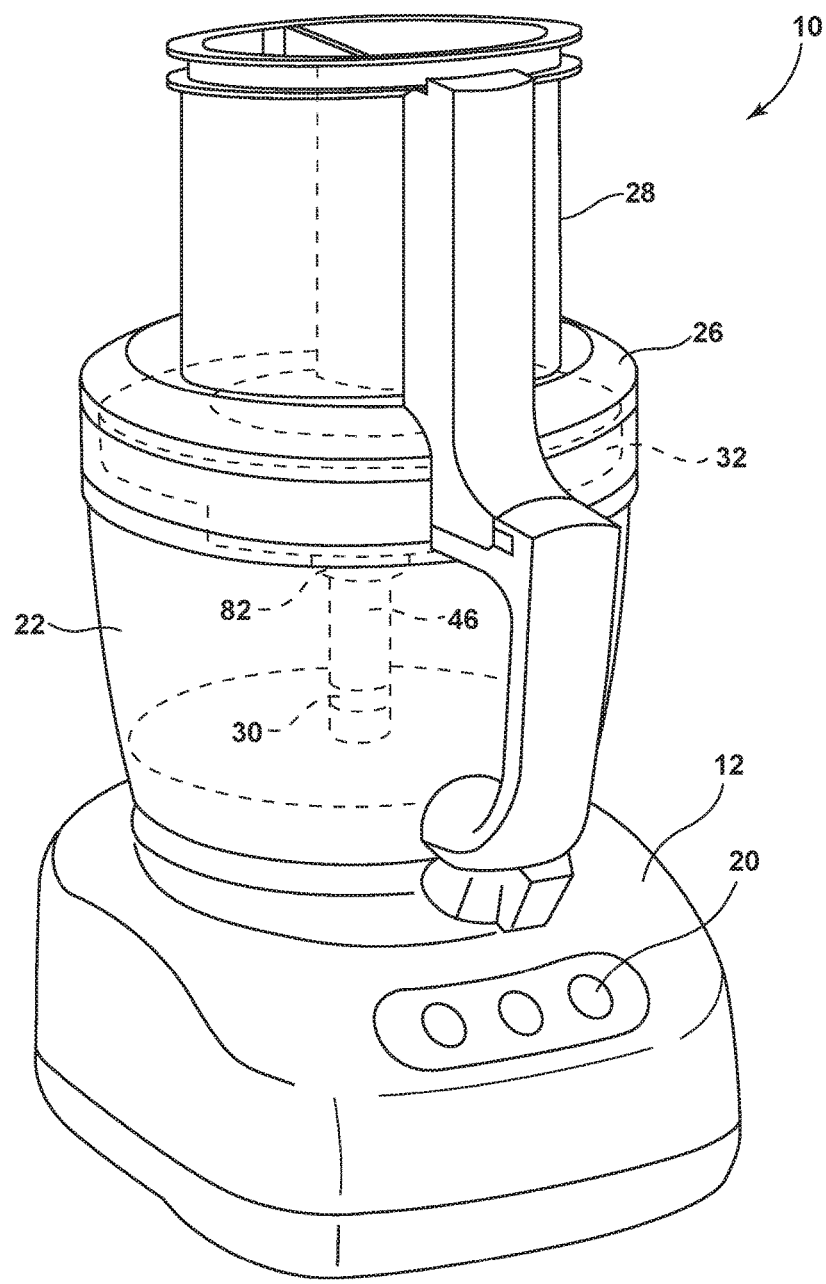
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIGS. 1-6, a food processor 10 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 10 has a base 12 that houses a motor 14 (shown schematically in FIG. 2) and a control unit (not shown). Under the control of the control unit, the motor's output shaft 16 drives a cutting blade 18 (see FIG. 2) to cut food items such as cheeses, meats, fruits, and vegetables. The base 12 also includes one or more buttons, switches, dials, or other types of controls 20. A user operates the controls 20 to control the operation of the motor 14 and hence the food processor 10. For instance, one of the controls 20 may be operable to turn the motor 14 on and off, while another control 20 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable bowl 22 is secured to the base 12. The bowl's handle facilitates placement of the bowl 22 on the base 12. The bowl 22 includes a removable lid 26 secured to its upper peripheral edge. The lid 26 has a feed tube 28 formed thereon through which food items such as cheeses, meats, fruits, and vegetables are inserted into the bowl 22 to be processed by the food processor 10. Collectively, the lid 26 and the bowl 22 define a processing chamber 24 where food items are processed by the cutting blade 18.

The bowl 22, lid 26, and feed tube 28 are generally made of a transparent or translucent plastic material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
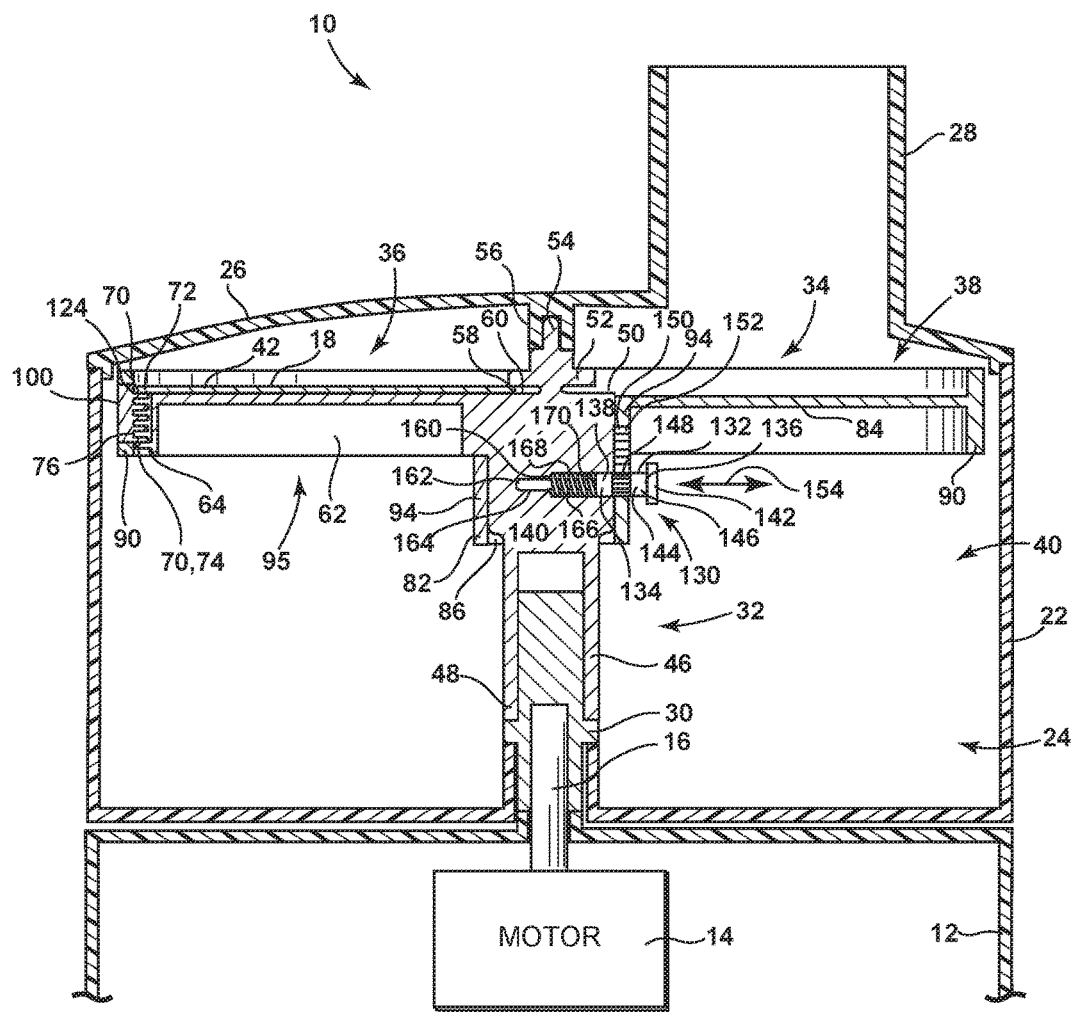
FIG. 2 is a partial cross-sectional view of the food processor of FIG. 1.
Figure 3:
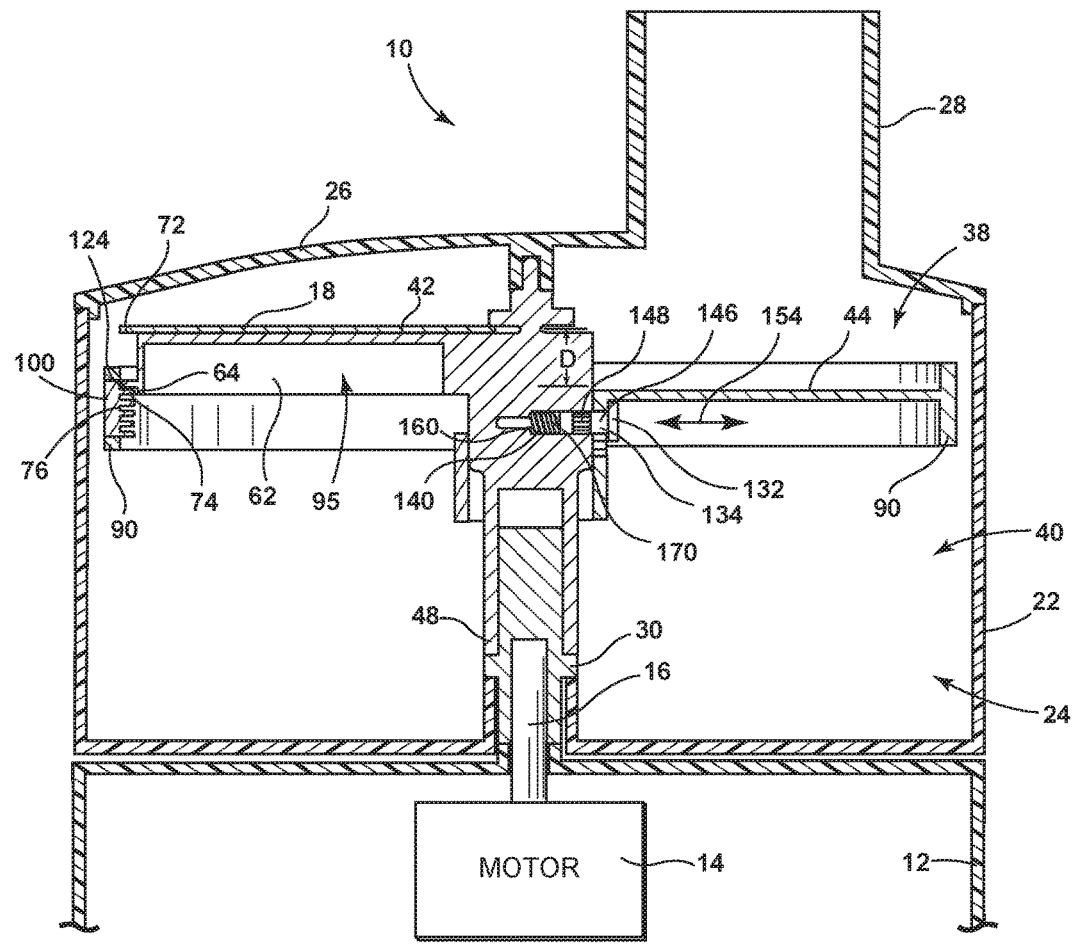
FIG. 3 is a view similar to FIG. 2, showing the rotating disk of the food slicer assembly of FIG. 2 in another position relative to the cutting blade.
Figure 4:
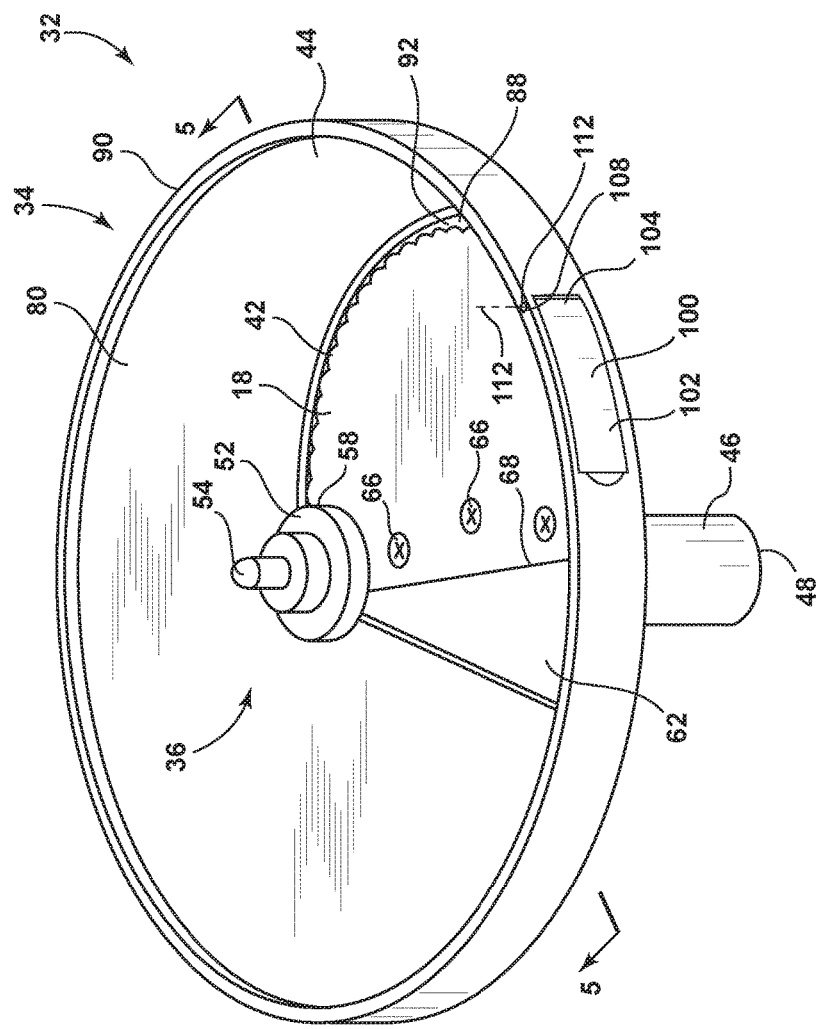
FIG. 4 is a perspective view of the food slicer assembly of FIG. 2.

As shown in FIGS. 2 and 3, when the removable bowl 22 is secured to the base 12, the output shaft 16 of the motor 14 is coupled to a drive stem 30. The drive stem 30 is in turn coupled to a food slicer assembly 32. As shown in FIGS. 2-4, the food slicer assembly 32 includes a rotating disk 34 and a blade assembly 36, with the cutting blade 18 being one component thereof. The rotating disk 34 effectively divides the processing chamber 24 into an upper compartment 38 located between the disk 34 and the lid 26, and a lower compartment 40 located below the rotating disk 34. A vertical distance, D, between the cutting edge 42 of the cutting blade 18 and the upper surface 44 of the rotating disk 34 defines a cutting thickness. In other words, the thickness of the pieces of food items cut by the food processor 10 is determined by the distance D between the cutting edge 42 of the cutting blade 18 and the upper surface 44 of the rotating disk 34. When the distance D between the cutting edge 42 of the cutting blade 18 and the upper surface 44 of the rotating disk 34 is increased, thicker pieces of food items are created, with thinner pieces of food items being created when the distance D between the cutting edge 42 of the cutting blade 18 and the upper surface 44 of the rotating disk 34 is decreased. As will be discussed in greater detail below, the rotating disk 34 is movable upwardly or downwardly between a plurality of cutting positions relative to the cutting blade 18 to vary the cutting thickness of the food processor 10, thereby creating thicker or thinner pieces of cut food items.

As shown in FIGS. 2-5, the blade assembly 36 includes a central shaft 46 that extends from a lower end 48 to an upper end 50. The lower end 48 receives the drive stem 30, thereby coupling the slicer assembly 32 to the output shaft 16 such that the slicer assembly 32 may be driven by the motor 14. The blade assembly 36 also includes a hub 52 positioned at the upper end 50 of the central shaft 46. As shown in FIG.

2, a tip 54 of the hub 52 is received in a guide sleeve 56 extending downward from the underside of the lid 26.

An inner edge 58 of the cutting blade 18 is received in a slot 60 formed between the hub 52 and the upper end 50 of the central shaft 46. As shown in FIGS. 2 and 3, the cutting blade 18 is secured within the slot 60 such that substantial deflection of the cutting blade 18 is inhibited when the cutting blade 18 cuts food items in the processing chamber 24. The cutting blade 18 is also secured to a mounting arm 62 extending away from the upper end 50 of the central shaft 46 to an end 64. A number of fasteners 66 (i.e., screws) positioned at a rear edge 68 of the cutting blade 18 extend into the mounting arm 62, thereby rigidly securing the cutting blade 18 to the mounting arm 62. It will be appreciated that in other embodiments the fasteners 66 may take the form of T-stakes, pins, posts, or other structures capable of securing the cutting blade 18 to the mounting arm 62. Additionally, the mounting arm 62 may include an overmold that receives the cutting blade 18.

As shown in FIGS. 2 and 3, the blade assembly 36 also includes a pair of flanges 70 extending beyond the end 64 of the mounting arm 62. One of the flanges 70 is an outer edge 72 of the cutting blade 18. Another flange 70 is an arcuate-shaped lip 74 extending outwardly from the end 64 of the mounting arm 62 that is parallel to the outer edge 72 of the cutting blade 18. As will be discussed in greater detail below, at least one of the flanges 70 is received in one of a plurality of slots 76 formed in the rotating disk 34 at each of the cutting positions.

The rotating disk 34 includes a planar body 80 and a central sleeve 82 extending downwardly from a lower surface 84 thereof. It will be appreciated that one or more of the components of the rotating disk 34 may be formed from plastic or a metallic material. The rotating disk 34 includes a passageway 86 that extends through the sleeve 82 and receives the central shaft 46 of the blade assembly 36. The planar body 80 also has a contoured opening 88 extending from the upper surface 44 to the lower surface 84. The contoured opening 88 is sized to receive the mounting arm 62 of the blade assembly 36. When the blade assembly 36 is positioned in the rotating disk 34, a gap or throat 92 is defined between the cutting edge 42 and the body 80, as shown in FIG. 4.

During operation, the motor 14 causes the blade assembly 36 to rotate. The blade assembly 36 acts on a sidewall 94 of the sleeve 82 such that the rotating disk 34 and the blade assembly 36 rotate together. Food items inserted through the feed tube 28 are urged into contact with the upper surface 44 of the rotating disk 34 while being acted upon (i.e., cut) by the cutting blade 18. Cut food items, along with other food items small enough to fit within the throat 92, pass from the upper compartment 38 into the lower compartment 40 through the throat 92.

Figure 5:
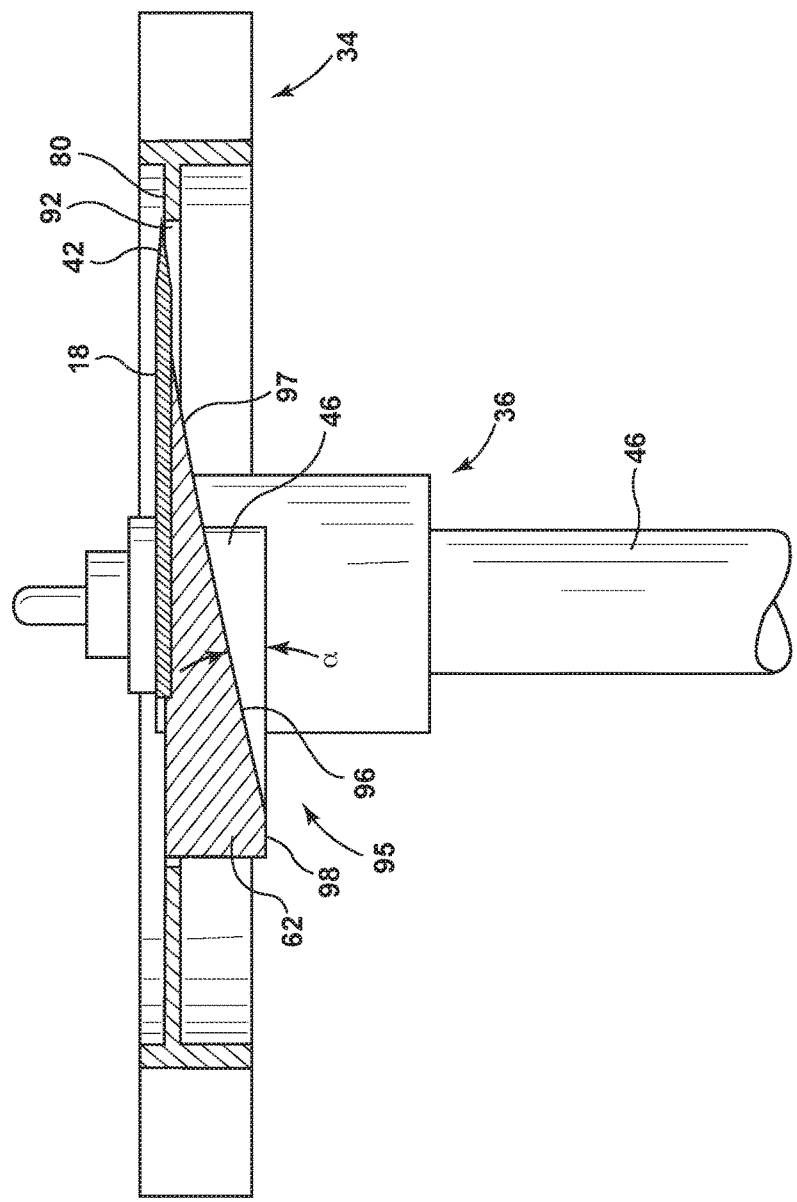
FIG. 5 is a partial cross-sectional view of the food slicer assembly of FIG. 2 taken along the line 5-5 shown in FIG. 4.

As best seen in FIGS. 2, 3, and 5, the mounting arm 62 has a ramp 95 defined therein, which guides food items from the throat 92 into the lower compartment 40 of the bowl 22. The surface 96 of the ramp 95 is sloped downward from an upper end 97 positioned adjacent to the cutting edge 42 to a lower end 98. As shown in FIG. 5, the surface 96 extends radially outward from the central shaft 46 to the end 64 of the mounting arm 62. The angle of inclination or slope of the surface 96 changes along the radially length of the surface 96, increasing from approximately 15 degrees at the end 64 to approximately 25 degrees near the central shaft 46. As shown in FIG. 5, the surface 96 has an angle of inclination α of approximately 22 degrees. In other embodiments, the surface 96 may be convex or concave in one or more directions. The central shaft 46 and the end 64 of the mounting arm 62 act as sidewalls for the surface 96 such that food items entering the throat 92 are guided down the ramp 95. In that way, the surface 96 is encapsulated or captured, thereby reducing the potential for food items to travel outside of the processing path and thus reducing unwanted debris.

A rim 90 extends upwardly from the outer perimeter of the disk's planar body 80. The rotating disk 34 has a diameter that is slightly less than the inner diameter of the bowl 22 such that the rim 90 is positioned adjacent to, but spaced slightly apart from, the inner wall of the bowl to permit rotation of the disk 34 within the bowl 22. The rotating disk 34 also includes a blade support 100 pivotably coupled to the rim 90.

Figure 6:
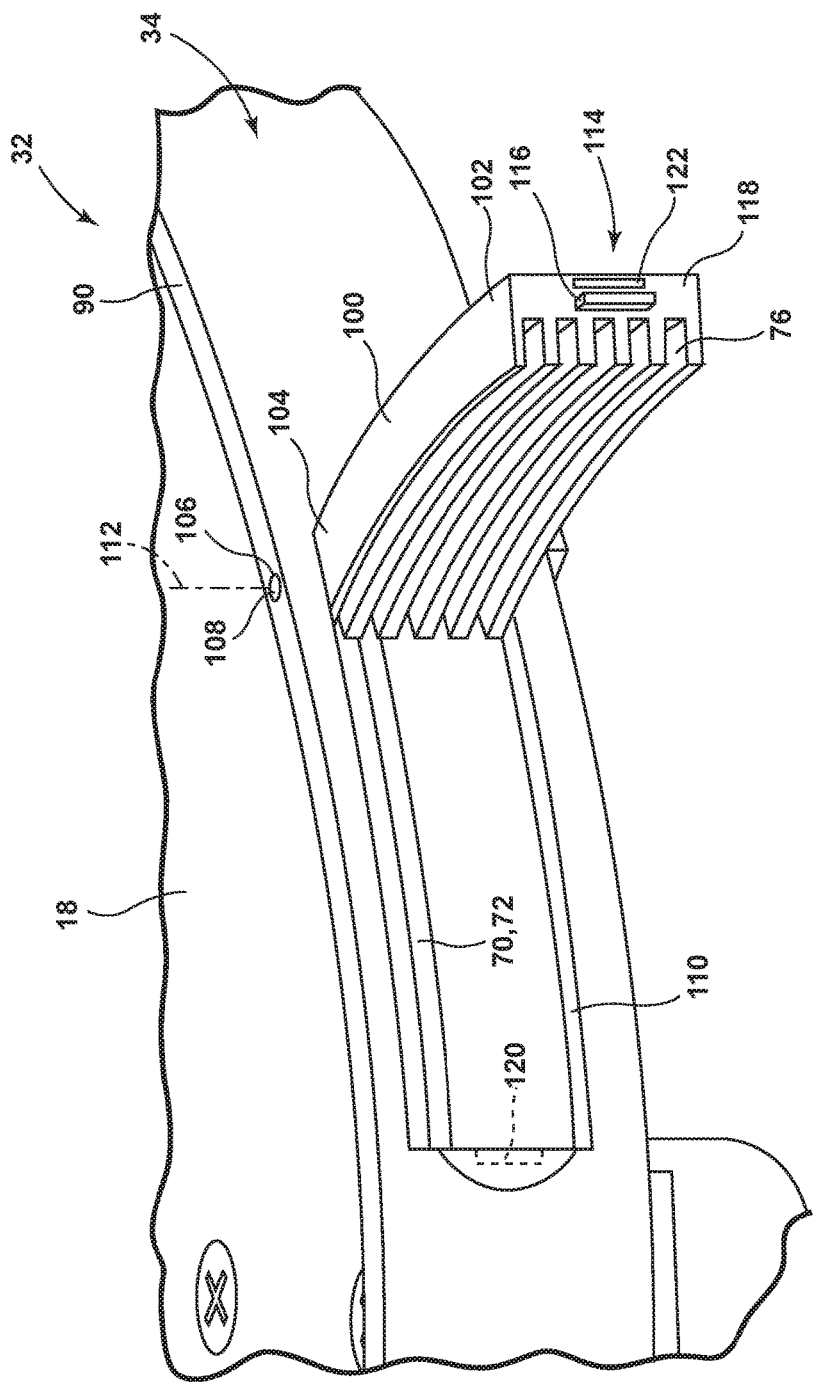
FIG. 6 is a fragmentary perspective view of a blade support of the food slicer assembly of FIG. 2.

As best seen in FIG. 6, the blade support 100 has the plurality of slots 76 formed therein. Each of the slots 76 extends parallel to the outer edge 72 of the cutting blade 18, and each of the slots 76 is sized to receive one of the flanges 70. In the illustrative embodiment, five slots 76 are formed in the blade support 100, and the slots 76 are spaced apart from each other by two millimeters. It will be appreciated that in other embodiments the blade support 100 may include additional or fewer slots and the spacing between the slots may be adjusted.

The blade support 100 has a body 102 extending from an end 104 hinged to the rim 90 at a pivot joint 106. The pivot joint 106 includes a cylindrical pivot pin 108 that extends through, and is positioned in, the rim 90 and the end 104. It will be appreciated that in other embodiments the pivot pin 108 may be formed as part of the blade support 100. As shown in FIGS. 4 and 6, the blade support 100 pivots relative to the rim 90 about an axis 112 defined by the pivot joint 106 between an engaged position and a disengaged position.

When the blade support 100 is in the engaged position (see FIGS. 2 and 3), one of the flanges 70 of the blade assembly 36 is received in a corresponding slot 76. In the engaged position, the body 102 is fully positioned in an opening 110 formed in the rim 90. When the blade support 100 is pivoted to the disengaged position, the body 102 extends outwardly from the opening 110, as shown in FIG. 6. In the disengaged position, the slots 76 are spaced apart from the flanges 70 of the blade assembly 36.

The rotating disk 34 includes a locking device 114 that secures the blade support 100 in the engaged position. In the illustrative embodiment, the locking device 114 includes a rectangular tab 116 extending from an end 118 of the body 102. When the blade support 100 is in the engaged position, the tab 116 is received in a recess 120 formed in the rim 90. Another recess 122 formed in the end 118 of the body 102 permits a user to apply sufficient force to release the blade support 100. It will be appreciated that in other embodiments the locking device 114 may take the form of a latch, pin, or other mechanism configured to maintain the blade support 100 in the engaged position.

As discussed above, the rotating disk 34 is movable upwardly and downwardly between a plurality of cutting positions relative to the cutting blade 18. As shown in FIG. 2, in one cutting position of the rotating disk 34, the outer edge 72 of the cutting blade 18 is received in the upper slot 124 of the blade support 100. In another cutting position, the lip 74 of the mounting arm 62 is received in the upper slot 124 of the blade support 100. In other cutting positions, the lip 74 may be positioned in any of the other slots 76 of the blade support 100. It will be appreciated that in other embodiments both flanges 70 of the blade assembly 36 may be received in slots 76 of the rotating disk 34. Additionally, in other embodiments, the blade assembly 36 may include only a single flange 70, such as, for example, the outer edge 72 of the cutting blade, which is received in a slot 76 at each of the cutting positions. In addition to providing support to the cutting blade 18, the engagement of one of the flanges 70 with one of the slots 76 inhibits or prevents the upward and downward movement of the rotating disk 34 when the blade support 100 is in the engaged position.

As shown in FIGS. 2 and 3, the food slicer assembly 32 includes a separate locking mechanism 130 positioned below the lower surface 84 of the rotating disk 34 that is configured to prevent the upward and downward movement of the rotating disk 34. In that way, the rotating disk 34 can be locked at one cutting position relative to the cutting blade 18. In the illustrative embodiment, the locking mechanism 130 is also configured to prevent the blade assembly 36 from rotating relative to the rotating disk 34.

As shown in FIGS. 2 and 3, the locking mechanism 130 includes a user-operated pin 132. The term "user-operated pin" as used herein refers to a pin that is manually operated by the user without the use of a tool. This is distinct from, and in contrast to, a set screw, hex bolt, or other fastener that is operated by the user through the use of a wrench, screw driver, or other tool. The user-operated pin 132 includes an elongated shaft 134 extending from an end 136 positioned outside of the sleeve 82 to an end 138 positioned in an aperture 140 defined in the central shaft 46. A button-head 142 sized to receive a finger of a user is formed at the end 136 of the shaft 134. The outer surface 144 of the shaft 134 includes a smooth section 146 and another section having a plurality of teeth 148 extending therefrom.

The shaft 134 of the user-operated pin 132 extends through a vertically-extending slot 150 defined in the sidewall 94 of the sleeve 82. The sidewall 94 includes a plurality of teeth 152 that extend into the slot 150. As indicated by arrow 154 in FIG. 2, the shaft 134 is movable between a locked position, in which the teeth 148 of the shaft 134 interdigitate or engage with a number of the teeth 152 of the sidewall 94, and an unlocked position, in which the teeth 148 of the user-operated pin are spaced apart from the teeth 152 of the sleeve. In the locked position, the rotating disk 34 is prevented from moving upward and downward relative to the cutting blade 18. It will be appreciated that in other embodiments the central shaft 46 may have a number of teeth configured to engage with the teeth 148 of the user-operated pin 132. It will also be appreciated that in other embodiments the user-operated pin 132, central shaft 46, and sleeve 82 may have any combination of slots, grooves, flanges, or other structures suitable for locking the rotating disk 34 in position relative to the cutting blade 18.

As shown in FIGS. 2 and 3, the aperture 140 defined in the central shaft 46 extends inwardly to a bottom 160. A cylindrical guide pin 162 is positioned in an opening 164 formed at the bottom 160 of the aperture 140 and extends away from the bottom 160 to an end. A spring 168 extends over the guide pin 162 is coupled at a spring end 170 to the end 138 of the user-operated pin 132. It will be appreciated that in other embodiments the guide pin 162 may take the form of a cross, hexagon, or other shape to provide guidance and stability to the spring 168. The spring 168 biases the user-operated pin 132 away from the bottom 160 of the aperture 140 thereby engaging the teeth 148 of the user-operated pin with the teeth 152 of the sleeve.

To change the distance D between the cutting edge 42 of the cutting blade 18 and the upper surface 44 of the rotating disk 34, the user unlocks the blade support 100 from the rim 90 and pivots the blade support 100 about the axis 112 from the engaged position to the disengaged position. The user then presses the button-head 142 to depress the user-operated pin 132. The spring 168 is compressed and the teeth 148 are moved out of contact with the teeth 152 of the sleeve 82. When the teeth 148 of the user-operated pin are spaced apart from the teeth 152 of the sleeve, the user may slide the rotating disk 34 upwardly or downwardly to another cutting position.

Once the rotating disk 34 is at the desired cutting position, the user releases the button-head 142, and the spring 168 urges the user-operated pin 132 away from the bottom 160 of the aperture 140, thereby reengaging the teeth 148 with the teeth 152 and locking the rotating disk 34 into the desired cutting position. The user pivots the blade support 100 from the disengaged position back to the engaged position, thereby preventing substantial deflection of the cutting blade 18 and providing an additional locking feature to prevent the upward/downward movement of the rotating disk 34 relative to the cutting blade 18.

It will be appreciated that in other embodiments the slicer assembly 32 may not include the blade support 100. In such embodiments, changing the distance D between the cutting edge 42 of the cutting blade 18 and the upper surface 44 of the rotating disk 34 would involve operating only the user-operated pin 132 of the locking mechanism 130. Similarly, in other embodiments including the blade support 100, the locking mechanism 130 may be omitted and replaced with a different thickness adjustment assembly operable by a user to vary the cutting thickness of the food processor 10. In those embodiments, changing the distance D between the cutting edge 42 of the cutting blade 18 and the upper surface 44 of the rotating disk 34 would involve, first, moving the blade support 100 to the disengaged position, which would release the rotating disk 34 for upward and downward movement, and, second, operating the thickness adjustment assembly.

Figure 7:
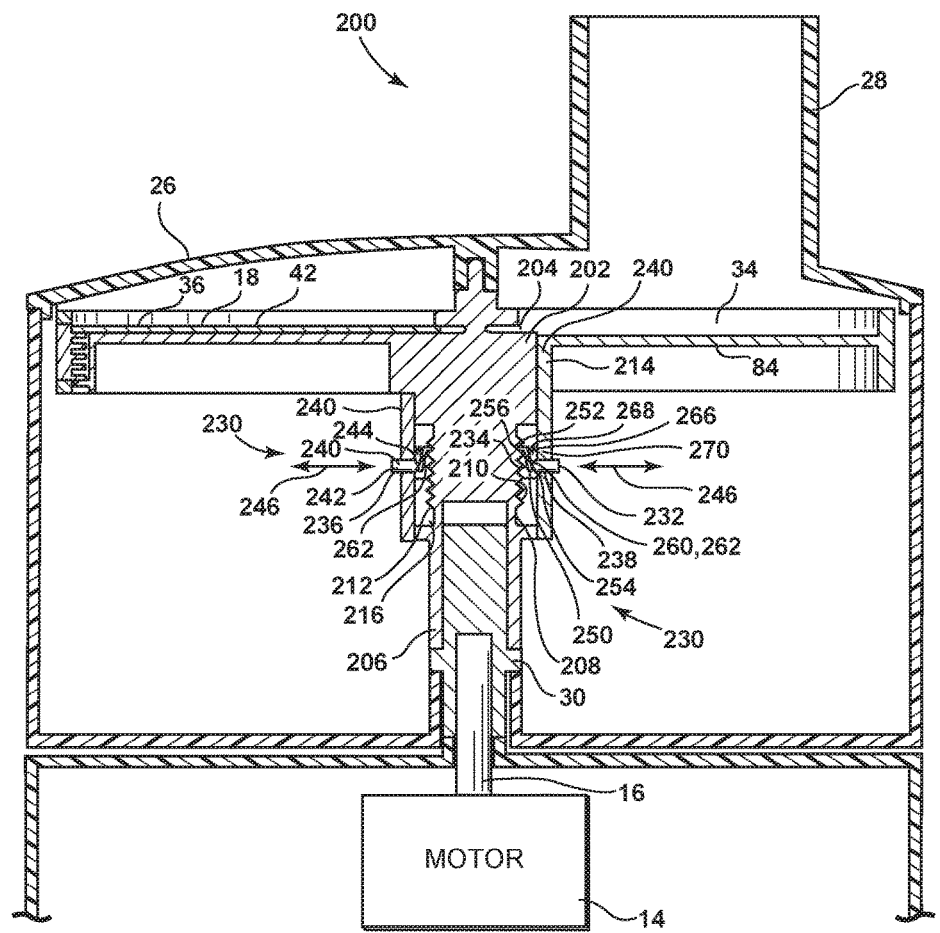
FIG. 7 is a partial cross-sectional view of another embodiment of a food processor.
Figure 8:
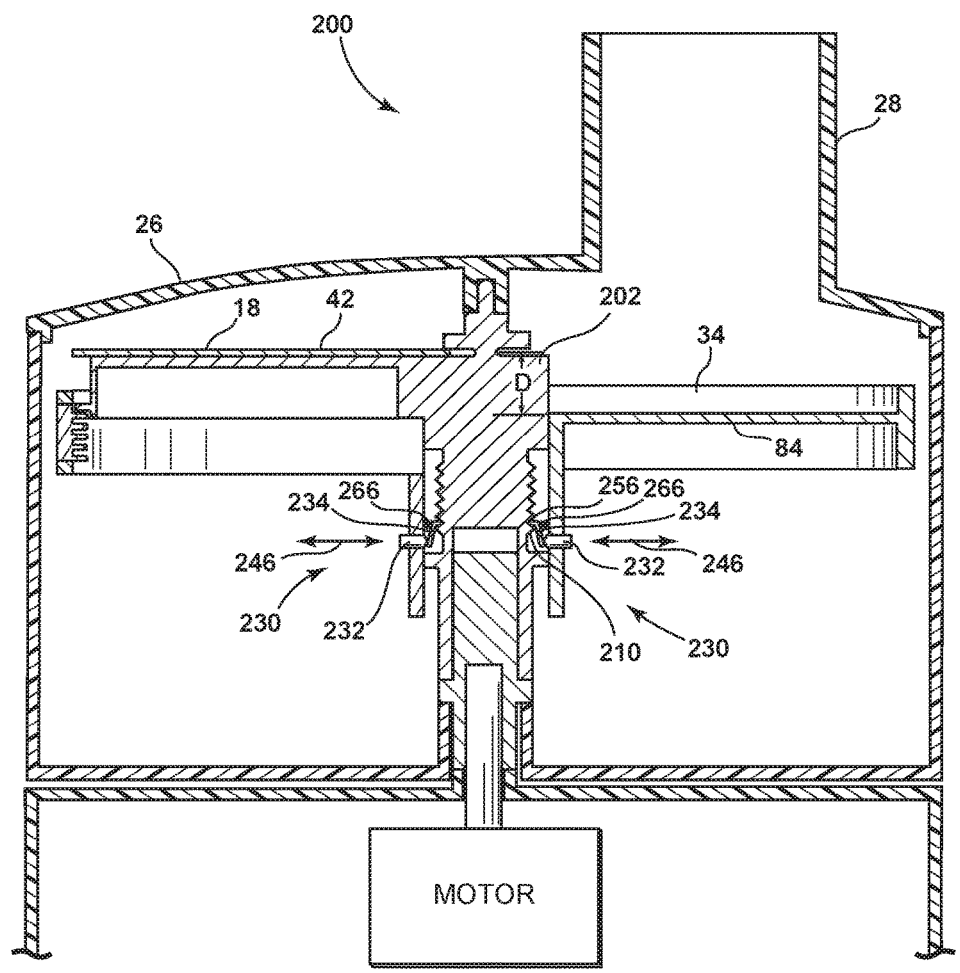
FIG. 8 is a view similar to FIG. 7, showing the rotating disk of the food slicer assembly of FIG. 7 in another position relative to the cutting blade.
Figure 9:
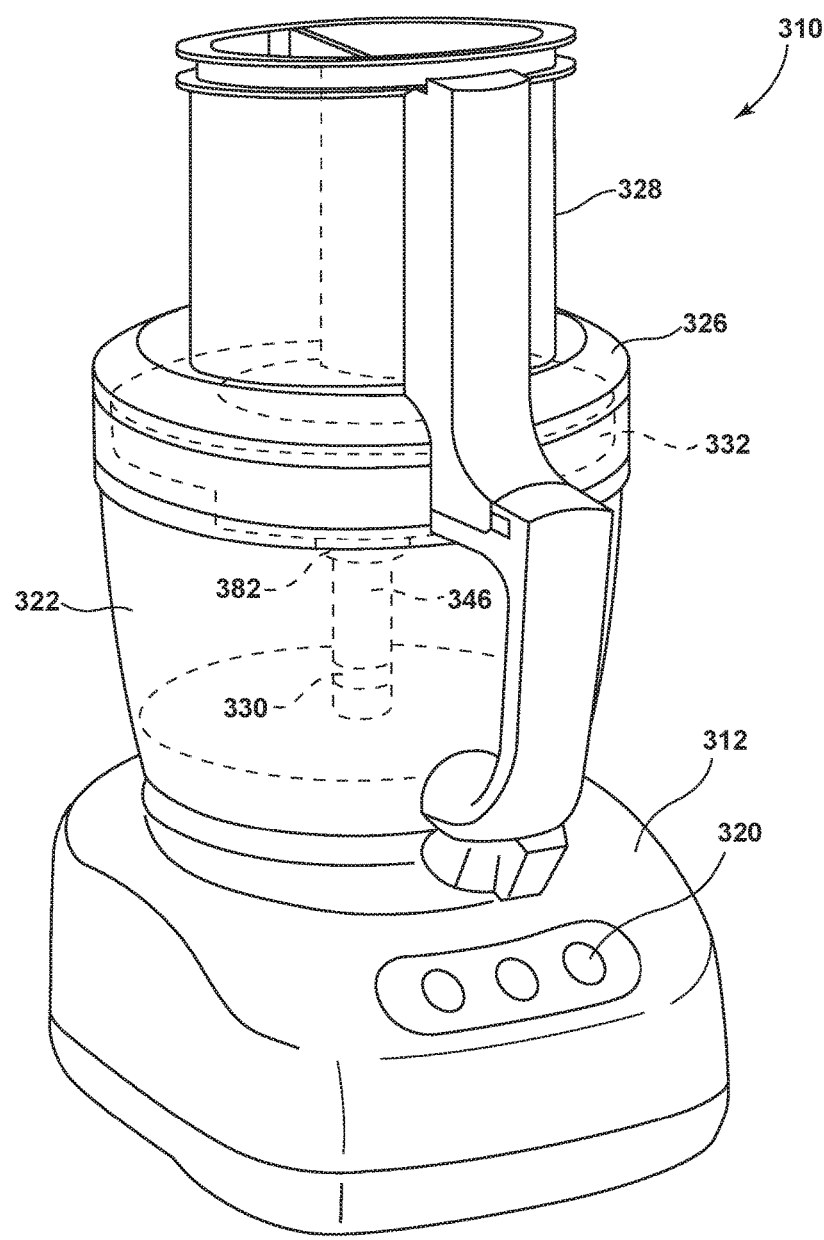
FIG. 9 is a perspective view of a food processor.

Referring now to FIGS. 7 and 8, another embodiment of a food slicer assembly is shown in a food processor. Many of the components of the food processor of FIGS. 7 and 8 are common with the components of the food processor of FIGS. 1-6. Such common components have common reference numerals. The food processor of FIGS. 7 and 8 is essentially the same as the food processor of FIGS. 1-6 except that the food slicer assembly (hereinafter food slicer assembly 200) includes a different locking mechanism to prevent the upward and downward movement rotating disk 34 relative to the cutting blade 18.

The slicer assembly 200, like the slicer assembly 32 described above in reference to FIGS. 1-6, includes a blade assembly 36 and a rotating disk 34. In addition to the cutting blade 18, the blade assembly 36 includes a central shaft 202 extending from an upper end 204 to a lower end 206. The lower end 206 receives the drive stem 30, thereby coupling the slicer assembly 200 to the motor 14. As shown in FIGS. 7 and 8, one section 208 of central shaft 202 has a plurality of teeth 210 extending outwardly from an outer surface 212 thereof.

The rotating disk 34 includes a central sleeve 214 extending downwardly from a lower surface 84 thereof. A passageway 216 extends through the sleeve 214 and receives the central shaft 202 of the blade assembly 36. Similar to the locking mechanism 130 described above in reference to FIGS. 1-6, a pair of locking mechanisms 230 are positioned below the lower surface 84 of the rotating disk 34.

Each locking mechanism 230 includes a user-operated pin 232 and a lever 234 coupled thereto. The user-operated pin 232 includes a shaft 236 that is positioned in a through-hole 238 formed in a sidewall 240 of the sleeve 214. The shaft 236 extends from an end 242 positioned outside of the sleeve 214 to an end 244 positioned in the passageway 216. The user-operated pin 232 moves back and forth within the through-hole 238, as indicated by arrow 246, between a locked position and an unlocked position.

The lever 234 is positioned within the passageway 216 and is pivotably coupled to the sidewall 240 of the sleeve 214. The lever 234 has a lever body 250 that extends from an upper end 252 to a lower end 254. The upper end 252 of lever body 250 includes a tip 256 that is sized to engage with the teeth 210 formed on the central shaft 202. The lower end 254 is coupled to the end 244 of the user-operated pin 232. As shown in FIGS. 7 and 8, the ends 244, 254 are in contact but are not fixed to each other. It will be appreciated that in other embodiments the ends 244, 254 may be pivotably fastened together.

The lever body 250 is pivotably coupled to the sidewall 240 at a pivot joint 260. The pivot joint 260 includes a cylindrical pivot pin 262 that extends through lever body 250 and the sidewall 240. The lever body 250 pivots about an axis defined by the pivot joint 260 between an engaged position and a disengaged position. In the engaged position, the tip 256 of the lever 234 is engaged with a number of the teeth 210 of the central shaft 202. When the lever 234 is in the engaged position, the rotating disk 34 is prevented from moving relative to the cutting blade 18. In the disengaged position, the tip 256 of the lever is spaced apart from the teeth 210 of the central shaft 202 such that the lever 234 does not prevent the rotating disk 34 from being moved to another cutting position.

A spring 266 is positioned in the passageway 216 of the sleeve 214 and is coupled to the upper end 252 of the lever body 250. The spring 266 extends from a spring end 268 coupled to the lever body 250 to a spring end 270 coupled to the sidewall 240 of the sleeve 214. The spring 266 biases the upper end 252 of the lever 234 toward the central shaft 202 thereby engaging the tip 256 with the teeth 210 of the central shaft 202.

When the user depresses the user-operated pin 232 of each locking mechanism 230, the user-operated pin 232 is moved from the locked position to the unlocked position. The shaft 236 of the user-operated pin 232 acts on the lower end 254 of the lever 234, thereby causing the lever 234 to pivot from the engaged position to the disengaged position. As the upper end 252 moves away from the central shaft 202, the spring 266 is compressed. Thus, when the user-operated pin 232 is in the unlocked position, the lever 234 is in the disengaged position.

When the user releases the user-operated pin 232, the spring 266 urges the upper end 252 toward the central shaft 202 thereby re-engaging the tip 256 with the teeth 210. As the lever 234 moves back to the engaged position, the lever body 250 urges the user-operated pin 232 back to the locked position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food slicers, dicers, ice shavers and the like. Similarly, the blade support could be removable from the rotating disk 34 instead of being pivotably coupled to the rim. Additionally, the rotating disk could be directly coupled to the motor, and the blade could be movable relative to the rotating disk.

Referring to FIGS. 9-14, a food processor 310 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 310 has a base 312 that houses a motor 314 (shown schematically in FIG. 10) and a control unit (not shown). Under the control of the control unit, the motor's output shaft 316 drives a cutting blade 318 (see FIG. 10) to cut food items such as cheeses, meats, fruits, and vegetables. The base 312 also includes one or more buttons, switches, dials, or other types of controls 320. A user operates the controls 320 to control the operation of the motor 314 and hence the food processor 310. For instance, one of the controls 320 may be operable to turn the motor 314 on and off, while another control 320 may change the motor's speed.

As will be understood by those skilled in the art, the control unit may comprise analog and/or digital circuitry to process electrical signals received from the motor 314 (or other components of the food processor 310) and provide electrical control signals to the motor or other components of the food processor 310. For example, the control unit may be embodied as a microcontroller that executes firmware routines to control the operation of the food processor 310.

A removable bowl 322 is secured to the base 312. The bowl's handle facilitates placement of the bowl 322 on the base 312. The bowl 322 includes a removable lid 326 secured to its upper peripheral edge. The lid 326 has a feed tube 328 formed thereon through which food items such as cheeses, meats, fruits, and vegetables are inserted into the bowl 322 to be processed by the food processor 310. Collectively, the lid 326 and the bowl 322 define a processing chamber 324 where food items are processed by the cutting blade 318.

The bowl 322, lid 326, and feed tube 328 are generally made of a transparent or translucent plastic material, so that the contents of the food processor 310 can be viewed by a user without removing the lid 326 from the bowl 322. Moreover, one or more locking mechanisms may be used to lock the bowl to the base 312 and the lid 326 to the bowl 322.

Figure 10:
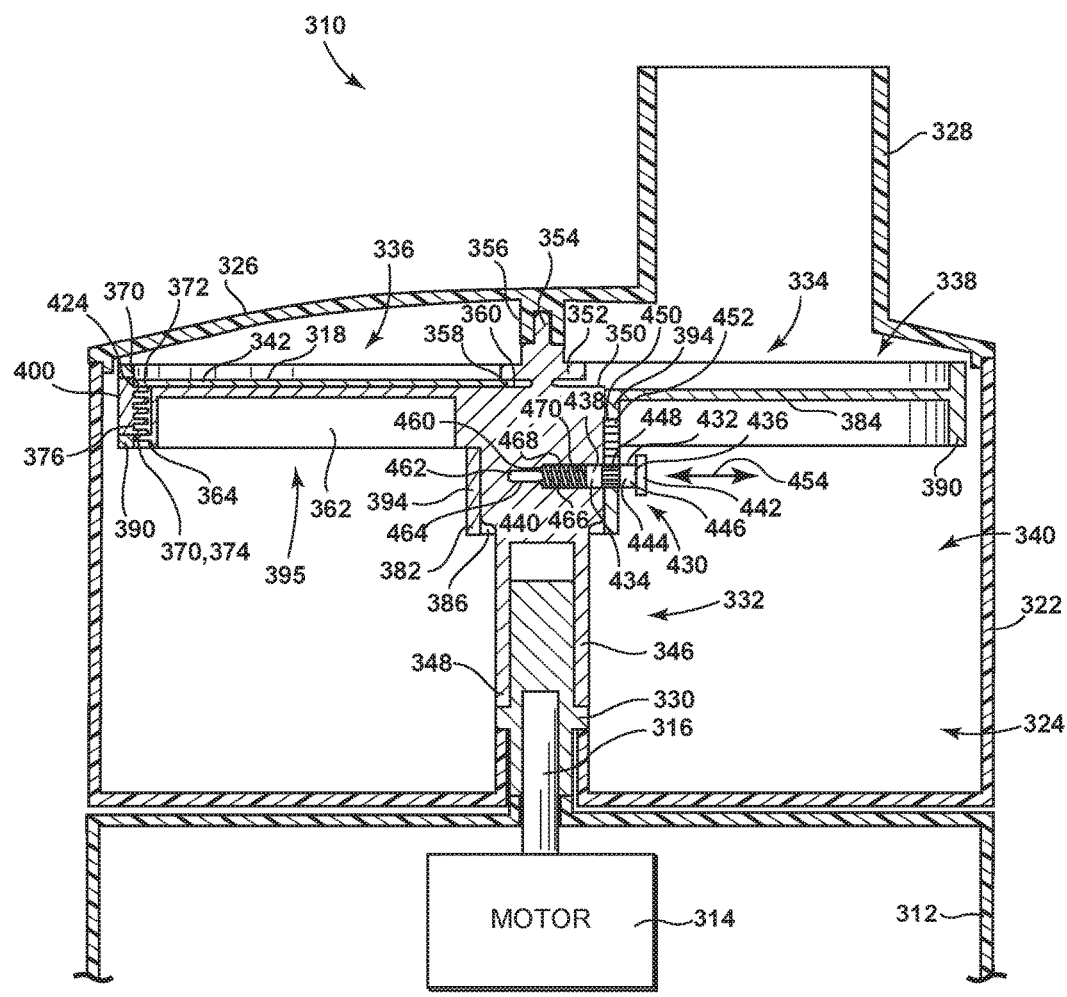
FIG. 10 is a partial cross-sectional view of the food processor of FIG. 1.
Figure 11:
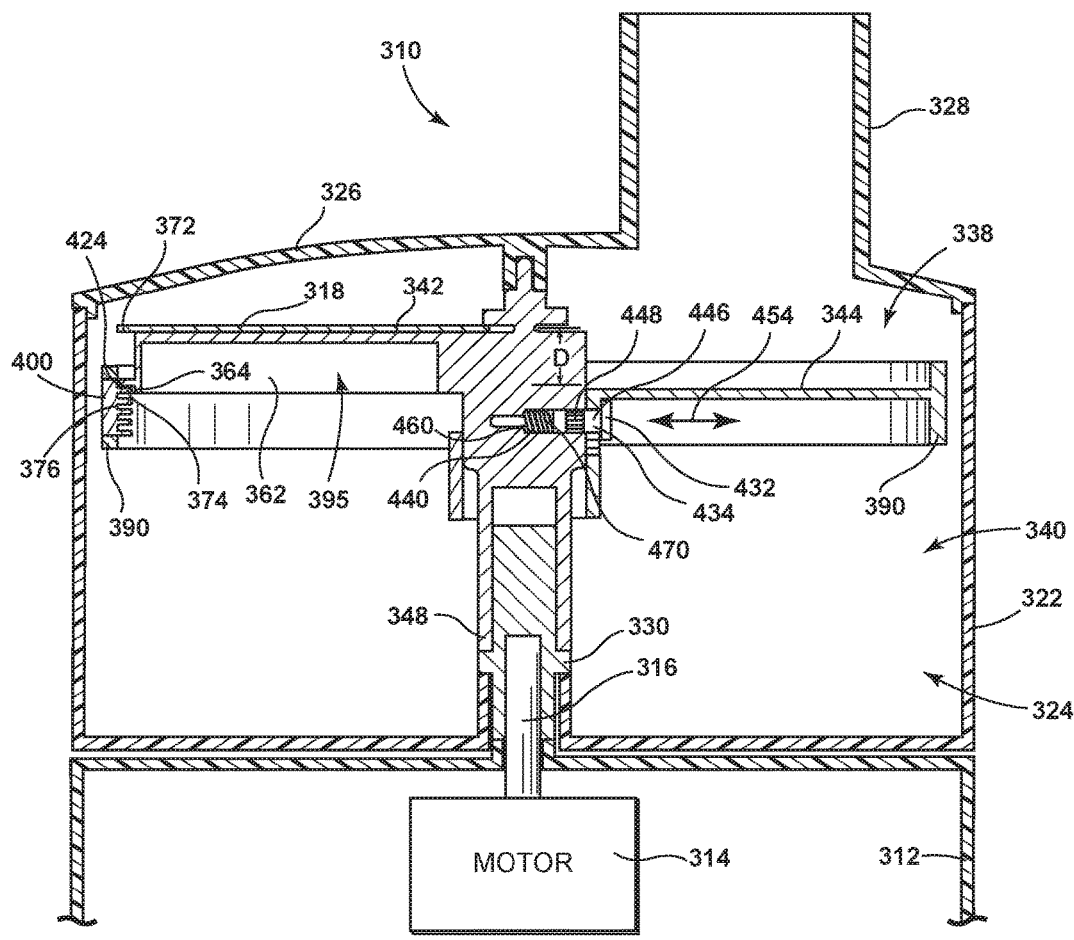
FIG. 11 is a view similar to FIG. 10, showing the rotating disk of the food slicer assembly of FIG. 10 in another position relative to the cutting blade.
Figure 12:
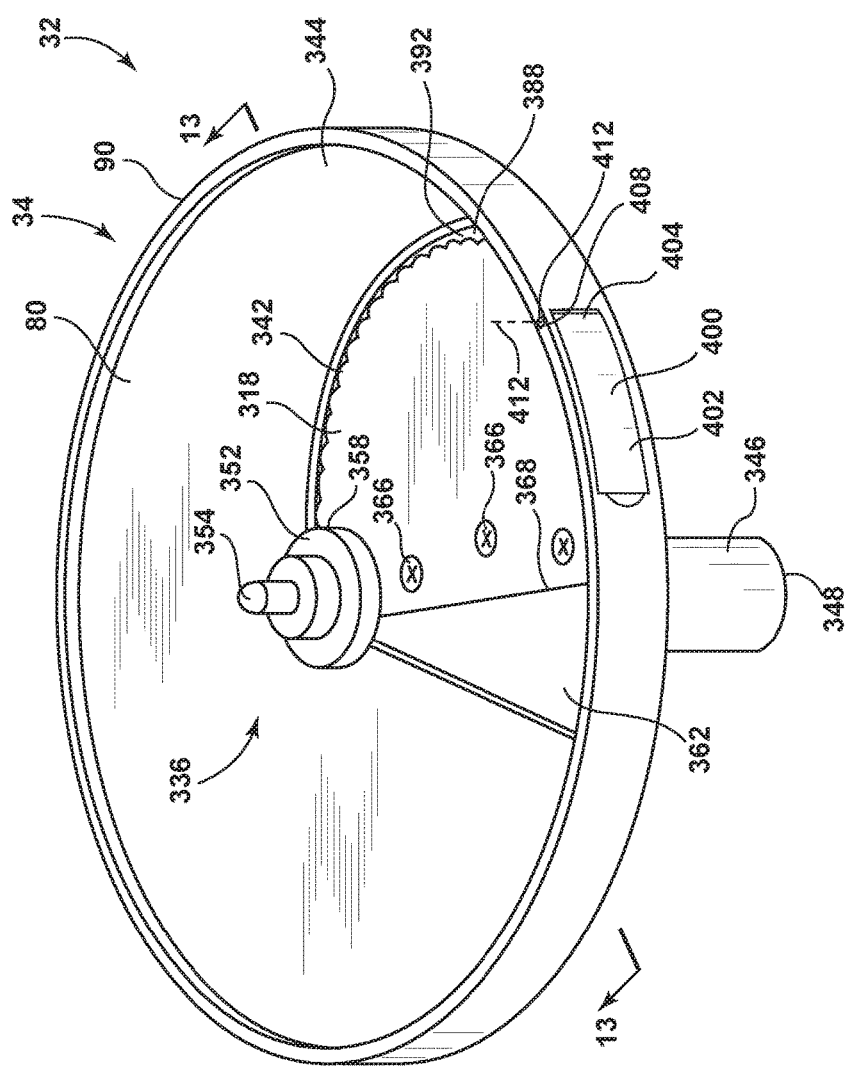
FIG. 12 is a perspective view of the food slicer assembly of FIG. 10.

As shown in FIGS. 10 and 11, when the removable bowl 322 is secured to the base 312, the output shaft 316 of the motor 314 is coupled to a drive stem 330. The drive stem 330 is in turn coupled to a food slicer assembly 332. As shown in FIGS. 10-12, the food slicer assembly 332 includes a rotating disk 334 and a blade assembly 336, with the cutting blade 318 being one component thereof. The rotating disk 334 effectively divides the processing chamber 324 into an upper compartment 338 located between the disk 334 and the lid 326, and a lower compartment 340 located below the rotating disk 334. A vertical distance, D, between the cutting edge 342 of the cutting blade 318 and the upper surface 344 of the rotating disk 334 defines a cutting thickness. In other words, the thickness of the pieces of food items cut by the food processor 310 is determined by the distance D between the cutting edge 342 of the cutting blade 18 and the upper surface 344 of the rotating disk 334. When the distance D between the cutting edge 342 of the cutting blade 318 and the upper surface 344 of the rotating disk 334 is increased, thicker pieces of food items are created, with thinner pieces of food items being created when the distance D between the cutting edge 342 of the cutting blade 318 and the upper surface 344 of the rotating disk 334 is decreased. As will be discussed in greater detail below, the rotating disk 334 is movable upwardly or downwardly between a plurality of cutting positions relative to the cutting blade 318 to vary the cutting thickness of the food processor 310, thereby creating thicker or thinner pieces of cut food items.

As shown in FIGS. 10-13, the blade assembly 336 includes a central shaft 346 that extends from a lower end 348 to an upper end 350. The lower end 348 receives the drive stem 330, thereby coupling the slicer assembly 332 to the output shaft 316 such that the slicer assembly 332 may be driven by the motor 314. The blade assembly 336 also includes a hub 352 positioned at the upper end 350 of the central shaft 346. As shown in FIG. 10, a tip 354 of the hub 352 is received in a guide sleeve 356 extending downward from the underside of the lid 326.

An inner edge 358 of the cutting blade 318 is received in a slot 360 formed between the hub 352 and the upper end 350 of the central shaft 346. As shown in FIGS. 10 and 11, the cutting blade 318 is secured within the slot 360 such that substantial deflection of the cutting blade 318 is inhibited when the cutting blade 318 cuts food items in the processing chamber 324. The cutting blade 318 is also secured to a mounting arm 362 extending away from the upper end 350 of the central shaft 346 to an end 364. A number of fasteners 366 (i.e., screws) (FIG. 12) positioned at a rear edge 368 of the cutting blade 318 extend into the mounting arm 362, thereby rigidly securing the cutting blade 318 to the mounting arm 362. It will be appreciated that in other embodiments the fasteners 366 may take the form of T-stakes, pins, posts, or other structures capable of securing the cutting blade 18 to the mounting arm 362. Additionally, the mounting arm 362 may include an overmold that receives the cutting blade 318.

As shown in FIGS. 10 and 11, the blade assembly 336 also includes a pair of flanges 370 extending beyond the end 364 of the mounting arm 362. One of the flanges 370 is an outer edge 372 of the cutting blade 318. Another flange 370 is an arcuate-shaped lip 374 extending outwardly from the end 364 of the mounting arm 362 that is parallel to the outer edge 372 of the cutting blade 318. As will be discussed in greater detail below, at least one of the flanges 370 is received in one of a plurality of slots 376 formed in the rotating disk 334 at each of the cutting positions.

The rotating disk 334 includes a planar body 380 and a central sleeve 382 extending downwardly from a lower surface 384 thereof. It will be appreciated that one or more of the components of the rotating disk 334 may be formed from plastic or a metallic material. The rotating disk 334 includes a passageway 386 that extends through the sleeve 382 and receives the central shaft 346 of the blade assembly 336. The planar body 380 also has a contoured opening 388 extending from the upper surface 344 to the lower surface 384. The contoured opening 388 is sized to receive the mounting arm 362 of the blade assembly 336. When the blade assembly 336 is positioned in the rotating disk 334, a gap or throat 392 is defined between the cutting edge 342 and the body 380, as shown in FIG. 12.

During operation, the motor 314 causes the blade assembly 336 to rotate. The blade assembly 336 acts on a sidewall 394 of the sleeve 382 such that the rotating disk 334 and the blade assembly 336 rotate together. Food items inserted through the feed tube 328 are urged into contact with the upper surface 344 of the rotating disk 334 while being acted upon (i.e., cut) by the cutting blade 318. Cut food items, along with other food items small enough to fit within the throat 392, pass from the upper compartment 338 into the lower compartment 340 through the throat 392.

Figure 13:
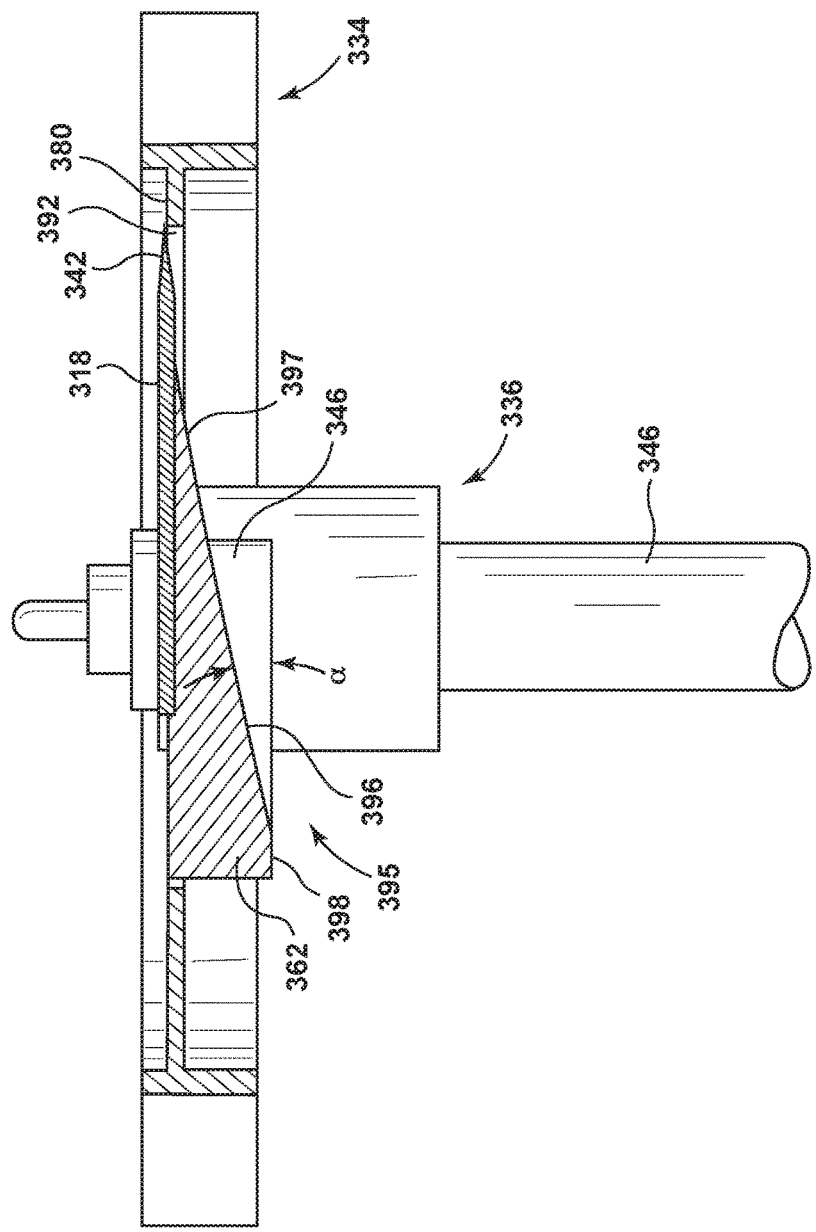
FIG. 13 is a partial cross-sectional view of the food slicer assembly of FIG. 10 taken along the line 13-13 shown in FIG. 12.

As best seen in FIG. 13, the mounting arm 362 has a ramp 395 defined therein, which guides food items from the throat 392 into the lower compartment 340 of the bowl 322. The surface 396 of the ramp 395 is sloped downward from an upper end 397 positioned adjacent to the cutting edge 342 to a lower end 398. As shown in FIGS. 10 and 11, the surface 396 extends radially outward from the central shaft 346 to the end 364 of the mounting arm 362. The angle of inclination or slope of the surface 396 changes along the radially length of the surface 396, increasing from approximately 15 degrees at the end 364 to approximately 25 degrees near the central shaft 346. As shown in FIG. 13, the surface 396 has an angle of inclination $\alpha$ of approximately 22 degrees. In other embodiments, the surface 396 may be convex or concave in one or more directions. The central shaft 346 and the end 364 of the mounting arm 362 act as sidewalls for the surface 396 such that food items entering the throat 392 are guided down the ramp 395. In that way, the surface 396 is encapsulated or captured, thereby reducing the potential for food items to travel outside of the processing path and thus reducing unwanted debris.

A rim 390 extends upwardly from the outer perimeter of the disk's planar body 380. The rotating disk 334 has a diameter that is slightly less than the inner diameter of the bowl 322 such that the rim 390 is positioned adjacent to, but spaced slightly apart from, the inner wall of the bowl to permit rotation of the disk 334 within the bowl 322. The rotating disk 334 also includes a blade support 400 pivotably coupled to the rim 90.

Figure 14:
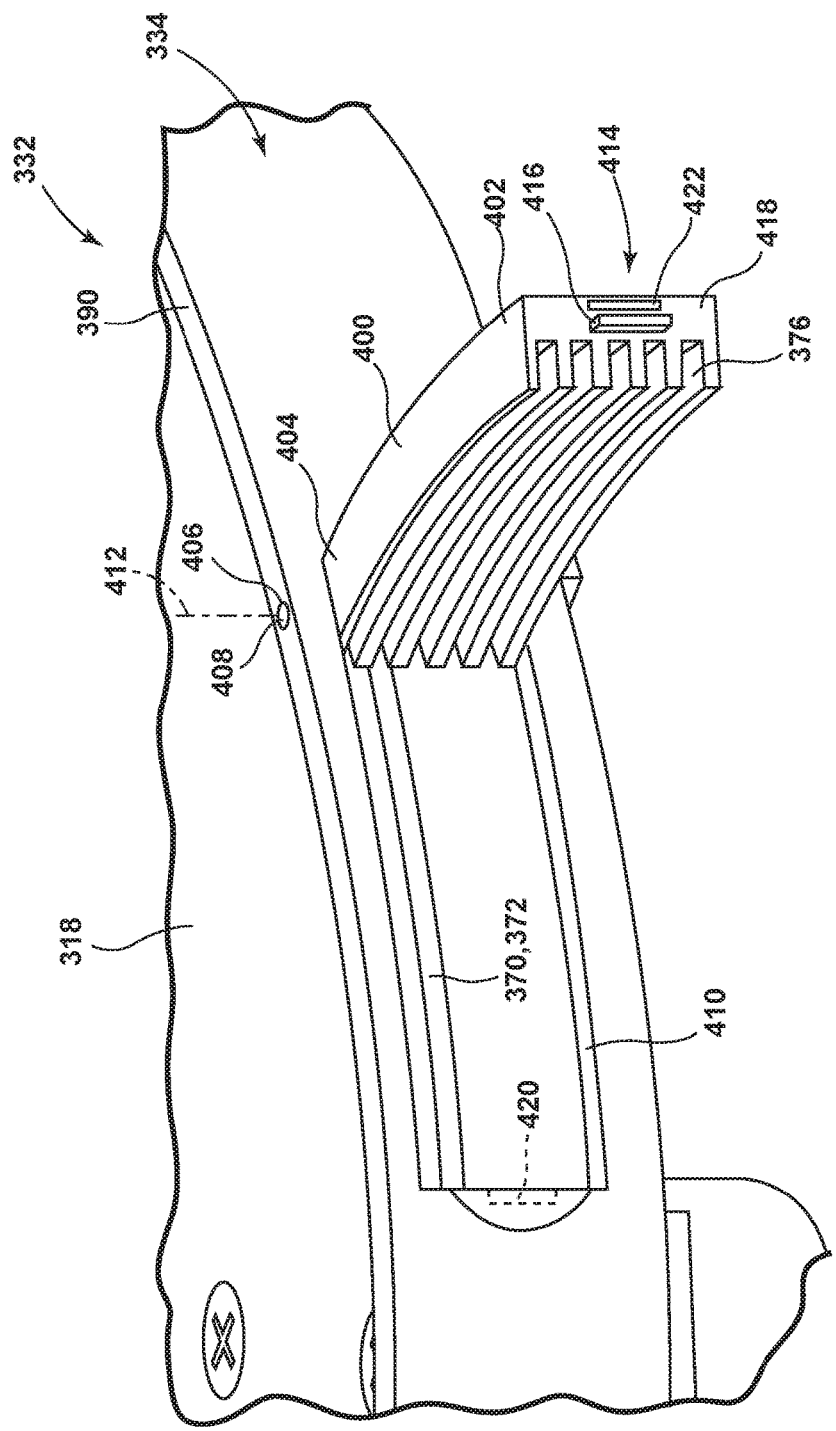
FIG. 14 is a fragmentary perspective view of a blade support of the food slicer assembly of FIG. 10.

As best seen in FIG. 14, the blade support 400 has the plurality of slots 376 formed therein. Each of the slots 376 extends parallel to the outer edge 372 of the cutting blade 318, and each of the slots 376 is sized to receive one of the flanges 370. In the illustrative embodiment, five slots 376 are formed in the blade support 400, and the slots 376 are spaced apart from each other by two millimeters. It will be appreciated that in other embodiments the blade support 400 may include additional or fewer slots and the spacing between the slots may be adjusted.

The blade support 400 has a body 402 extending from an end 404 hinged to the rim 390 at a pivot joint 406. The pivot joint 406 includes a cylindrical pivot pin 408 that extends through, and is positioned in, the rim 390 and the end 404. It will be appreciated that in other embodiments the pivot pin 408 may be formed as part of the blade support 400. As shown in FIGS. 12 and 14, the blade support 400 pivots relative to the rim 390 about an axis 412 defined by the pivot joint 406 between an engaged position and a disengaged position.

When the blade support 400 is in the engaged position (see FIGS. 10 and 11), one of the flanges 370 of the blade assembly 336 is received in a corresponding slot 376. In the engaged position, the body 402 is fully positioned in an opening 410 formed in the rim 390. When the blade support 400 is pivoted to the disengaged position, the body 402 extends outwardly from the opening 410, as shown in FIG. 14. In the disengaged position, the slots 376 are spaced apart from the flanges 370 of the blade assembly 336.

The rotating disk 334 includes a locking device 414 that secures the blade support 400 in the engaged position. In the illustrative embodiment, the locking device 414 includes a rectangular tab 416 extending from an end 418 of the body 402. When the blade support 400 is in the engaged position, the tab 416 is received in a recess 420 formed in the rim 390. Another recess 422 formed in the end 418 of the body 402 permits a user to apply sufficient force to release the blade support 400. It will be appreciated that in other embodiments the locking device 414 may take the form of a latch, pin, or other mechanism configured to maintain the blade support 400 in the engaged position.

As discussed above, the rotating disk 334 is movable upwardly and downwardly between a plurality of cutting positions relative to the cutting blade 318. As shown in FIG. 10, in one cutting position of the rotating disk 334, the outer edge 372 of the cutting blade 318 is received in the upper slot 424 of the blade support 400. In another cutting position, the lip 374 of the mounting arm 362 is received in the upper slot 424 of the blade support 400. In other cutting positions, the lip 374 may be positioned in any of the other slots 376 of the blade support 400. It will be appreciated that in other embodiments both flanges 370 of the blade assembly 336 may be received in slots 376 of the rotating disk 334. Additionally, in other embodiments, the blade assembly 336 may include only a single flange 370, such as, for example, the outer edge 372 of the cutting blade, which is received in a slot 376 at each of the cutting positions. In addition to providing support to the cutting blade 318, the engagement of one of the flanges 370 with one of the slots 376 inhibits or prevents the upward and downward movement of the rotating disk 334 when the blade support 400 is in the engaged position.

As shown in FIGS. 10 and 11, the food slicer assembly 332 includes a separate locking mechanism 430 positioned below the lower surface 384 of the rotating disk 334 that is configured to prevent the upward and downward movement of the rotating disk 334. In that way, the rotating disk 334 can be locked at one cutting position relative to the cutting blade 318. In the illustrative embodiment, the locking mechanism 430 is also configured to prevent the blade assembly 336 from rotating relative to the rotating disk 334.

As shown in FIGS. 10 and 11, the locking mechanism 430 includes a user-operated pin 432. The term "user-operated pin" as used herein refers to a pin that is manually operated by the user without the use of a tool. This is distinct from, and in contrast to, a set screw, hex bolt, or other fastener that is operated by the user through the use of a wrench, screw driver, or other tool. The user-operated pin 432 includes an elongated shaft 434 extending from an end 436 positioned outside of the sleeve 382 to an end 438 positioned in an aperture 440 defined in the central shaft 346. A button-head 442 sized to receive a finger of a user is formed at the end 436 of the shaft 434. The outer surface 444 of the shaft 434 includes a smooth section 446 and another section having a plurality of teeth 448 extending therefrom.

The shaft 434 of the user-operated pin 432 extends through a vertically-extending slot 450 defined in the sidewall 394 of the sleeve 382. The sidewall 394 includes a plurality of teeth 452 that extend into the slot 450. As indicated by arrow 454 in FIG. 10, the shaft 434 is movable between a locked position, in which the teeth 448 of the shaft 434 interdigitate or engage with a number of the teeth 452 of the sidewall 394, and an unlocked position, in which the teeth 348 of the user-operated pin are spaced apart from the teeth 352 of the sleeve. In the locked position, the rotating disk 334 is prevented from moving upward and downward relative to the cutting blade 318. It will be appreciated that in other embodiments the central shaft 346 may have a number of teeth configured to engage with the teeth 448 of the user-operated pin 432. It will also be appreciated that in other embodiments the user-operated pin 432, central shaft 346, and sleeve 382 may have any combination of slots, grooves, flanges, or other structures suitable for locking the rotating disk 334 in position relative to the cutting blade 318.

As shown in FIGS. 10 and 11, the aperture 440 defined in the central shaft 346 extends inwardly to a bottom 460. A cylindrical guide pin 462 is positioned in an opening 464 formed at the bottom 460 of the aperture 440 and extends away from the bottom 460 to an end. A spring 368 extends over the guide pin 462 and is coupled at a spring end 470 to the end 438 of the user-operated pin 432. It will be appreciated that in other embodiments the guide pin 462 may take the form of a cross, hexagon, or other shape to provide guidance and stability to the spring 468. The spring 468 biases the user-operated pin 432 away from the bottom 460 of the aperture 440 thereby engaging the teeth 448 of the user-operated pin with the teeth 452 of the sleeve.

To change the distance D between the cutting edge 442 of the cutting blade 418 and the upper surface 344 of the rotating disk 334, the user unlocks the blade support 400 from the rim 390 and pivots the blade support 400 about the axis 412 from the engaged position to the disengaged position. The user then presses the button-head 442 to depress the user-operated pin 432. The spring 468 is compressed and the teeth 448 are moved out of contact with the teeth 452 of the sleeve 382. When the teeth 448 of the user-operated pin are spaced apart from the teeth 452 of the sleeve, the user may slide the rotating disk 334 upwardly or downwardly to another cutting position.

Once the rotating disk 334 is at the desired cutting position, the user releases the button-head 442, and the spring 468 urges the user-operated pin 432 away from the bottom 460 of the aperture 440, thereby reengaging the teeth 448 with the teeth 452 and locking the rotating disk 334 into the desired cutting position. The user pivots the blade support 400 from the disengaged position back to the engaged position, thereby preventing substantial deflection of the cutting blade 318 and providing an additional locking feature to prevent the upward/downward movement of the rotating disk 334 relative to the cutting blade 318.

It will be appreciated that in other embodiments the slicer assembly 332 may not include the blade support 400. In such embodiments, changing the distance D between the cutting edge 342 of the cutting blade 318 and the upper surface 344 of the rotating disk 334 would involve operating only the user-operated pin 432 of the locking mechanism 430. Similarly, in other embodiments including the blade support 400, the locking mechanism 430 may be omitted and replaced with a different thickness adjustment assembly operable by a user to vary the cutting thickness of the food processor 310. In those embodiments, changing the distance D between the cutting edge 342 of the cutting blade 318 and the upper surface 344 of the rotating disk 334 would involve, first, moving the blade support 400 to the disengaged position, which would release the rotating disk 334 for upward and downward movement, and, second, operating the thickness adjustment assembly.

Figure 15:
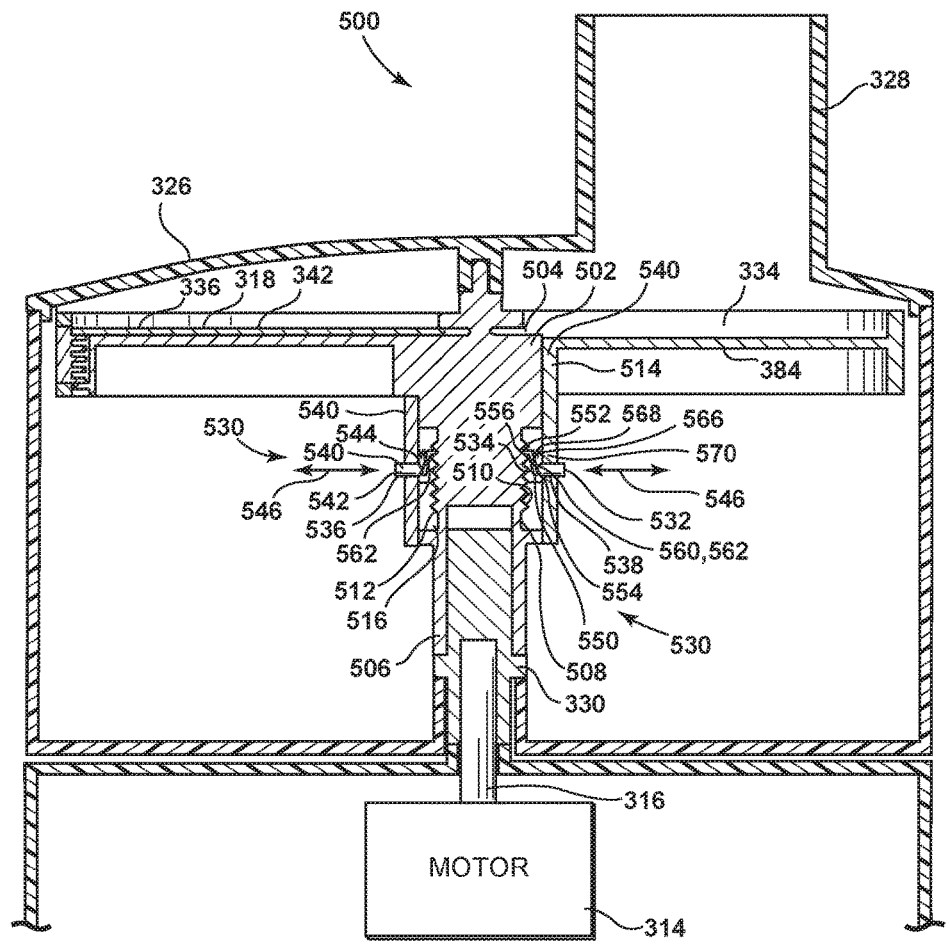
FIG. 15 is a partial cross-sectional view of another embodiment of a food processor.
Figure 16:
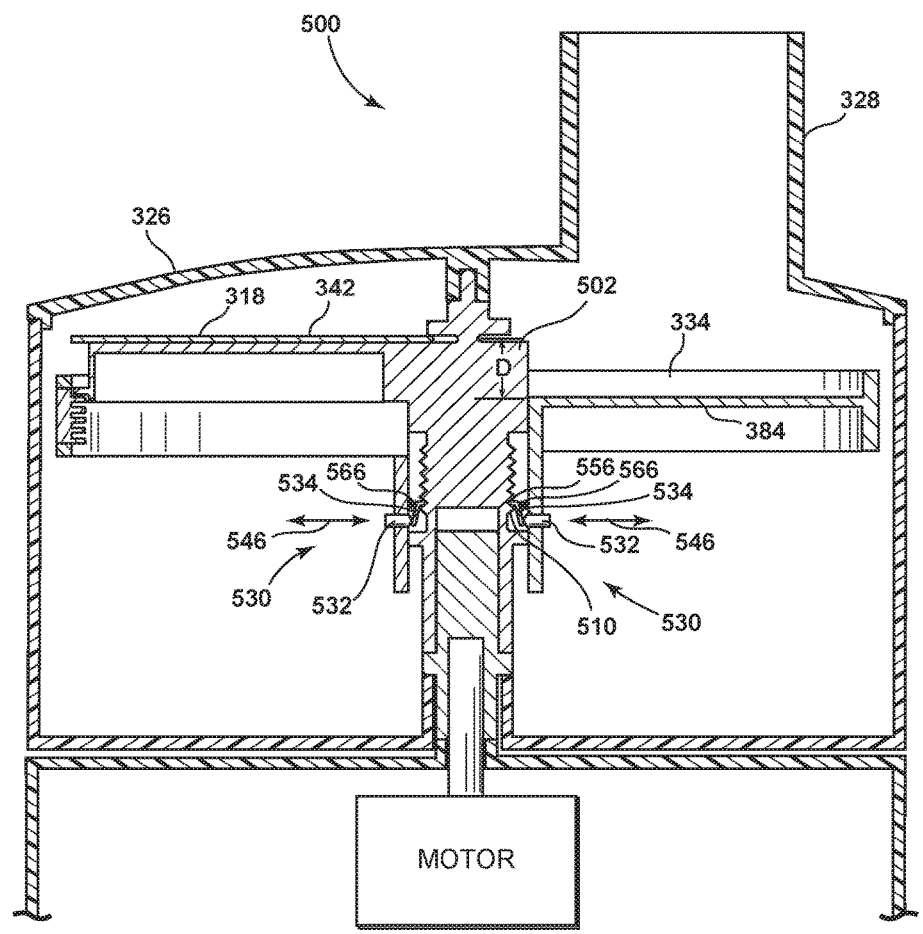
FIG. 16 is a view similar to FIG. 15, showing the rotating disk of the food slicer assembly of FIG. 15 in another position relative to the cutting blade.

Referring now to FIGS. 15 and 16 another embodiment of a food slicer assembly is shown in a food processor. Many of the components of the food processor of FIGS. 15 and 16 are common with the components of the food processor of FIGS. 9-14. Such common components have common reference numerals. The food processor of FIGS. 15 and 16 is essentially the same as the food processor of FIGS. 9-14 except that the food slicer assembly (hereinafter food slicer assembly 500) includes a different locking mechanism to prevent the upward and downward movement rotating disk 334 relative to the cutting blade 318.

The slicer assembly 500, like the slicer assembly 332 described above in reference to FIGS. 9-14, includes a blade assembly 336 and a rotating disk 334. In addition to the cutting blade 318, the blade assembly 336 includes a central shaft 502 extending from an upper end 504 to a lower end 506. The lower end 506 receives the drive stem 330, thereby coupling the slicer assembly 500 to the motor 314. As shown in FIGS. 15 and 16, one section 508 of central shaft 502 has a plurality of teeth 510 extending outwardly from an outer surface 512 thereof.

The rotating disk 334 includes a central sleeve 514 extending downwardly from a lower surface 384 thereof. A passageway 516 extends through the sleeve 514 and receives the central shaft 502 of the blade assembly 336. Similar to the locking mechanism 430 described above in reference to FIGS. 9-14, a pair of locking mechanisms 530 are positioned below the lower surface 384 of the rotating disk 334.

Each locking mechanism 530 includes a user-operated pin 532 and a lever 534 coupled thereto. The user-operated pin 532 includes a shaft 536 that is positioned in a through-hole 538 formed in a sidewall 540 of the sleeve 514. The shaft 536 extends from an end 542 positioned outside of the sleeve 514 to an end 544 positioned in the passageway 516. The user-operated pin 532 moves back and forth within the through-hole 538, as indicated by arrow 546, between a locked position and an unlocked position.

The lever 534 is positioned within the passageway 516 and is pivotably coupled to the sidewall 541 of the sleeve 514. The lever 534 has a lever body 550 that extends from an upper end 552 to a lower end 554. The upper end 552 of lever body 550 includes a tip 556 that is sized to engage with the teeth 510 formed on the central shaft 502. The lower end 554 is coupled to the end 544 of the user-operated pin 532. As shown in FIGS. 15 and 16, the ends 544, 554 are in contact but are not fixed to each other. It will be appreciated that in other embodiments the ends 544, 554 may be pivotably fastened together.

The lever body 550 is pivotably coupled to the sidewall 540 at a pivot joint 560. The pivot joint 560 includes a cylindrical pivot pin 562 that extends through lever body 550 and the sidewall 540. The lever body 550 pivots about an axis defined by the pivot joint 560 between an engaged position and a disengaged position. In the engaged position, the tip 556 of the lever 534 is engaged with a number of the teeth 510 of the central shaft 502. When the lever 534 is in the engaged position, the rotating disk 334 is prevented from moving relative to the cutting blade 318. In the disengaged position, the tip 556 of the lever is spaced apart from the teeth 510 of the central shaft 502 such that the lever 534 does not prevent the rotating disk 334 from being moved to another cutting position.

A spring 566 is positioned in the passageway 516 of the sleeve 514 and is coupled to the upper end 552 of the lever body 550. The spring 566 extends from a spring end 568 coupled to the lever body 550 to a spring end 570 coupled to the sidewall 540 of the sleeve 514. The spring 566 biases the upper end 552 of the lever 534 toward the central shaft 502 thereby engaging the tip 556 with the teeth 510 of the central shaft 502.

When the user depresses the user-operated pin 532 of each locking mechanism 530, the user-operated pin 532 is moved from the locked position to the unlocked position. The shaft 536 of the user-operated pin 532 acts on the lower end 554 of the lever 534, thereby causing the lever 534 to pivot from the engaged position to the disengaged position. As the upper end 552 moves away from the central shaft 502, the spring 566 is compressed. Thus, when the user-operated pin 532 is in the unlocked position, the lever 534 is in the disengaged position.

When the user releases the user-operated pin 532, the spring 566 urges the upper end 552 toward the central shaft 502 thereby re-engaging the tip 556 with the teeth 510. As the lever 534 moves back to the engaged position, the lever body 550 urges the user-operated pin 532 back to the locked position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 310 is herein illustrated as a conventional domestic food processor, the features and aspects disclosed herein can also be implemented in other types of food processing devices such as automatic food slicers, dicers, ice shavers and the like. Similarly, the blade support could be removable from the rotating disk 334 instead of being pivotably coupled to the rim. Additionally, the rotating disk could be directly coupled to the motor, and the blade could be movable relative to the rotating disk.

Figure 17:
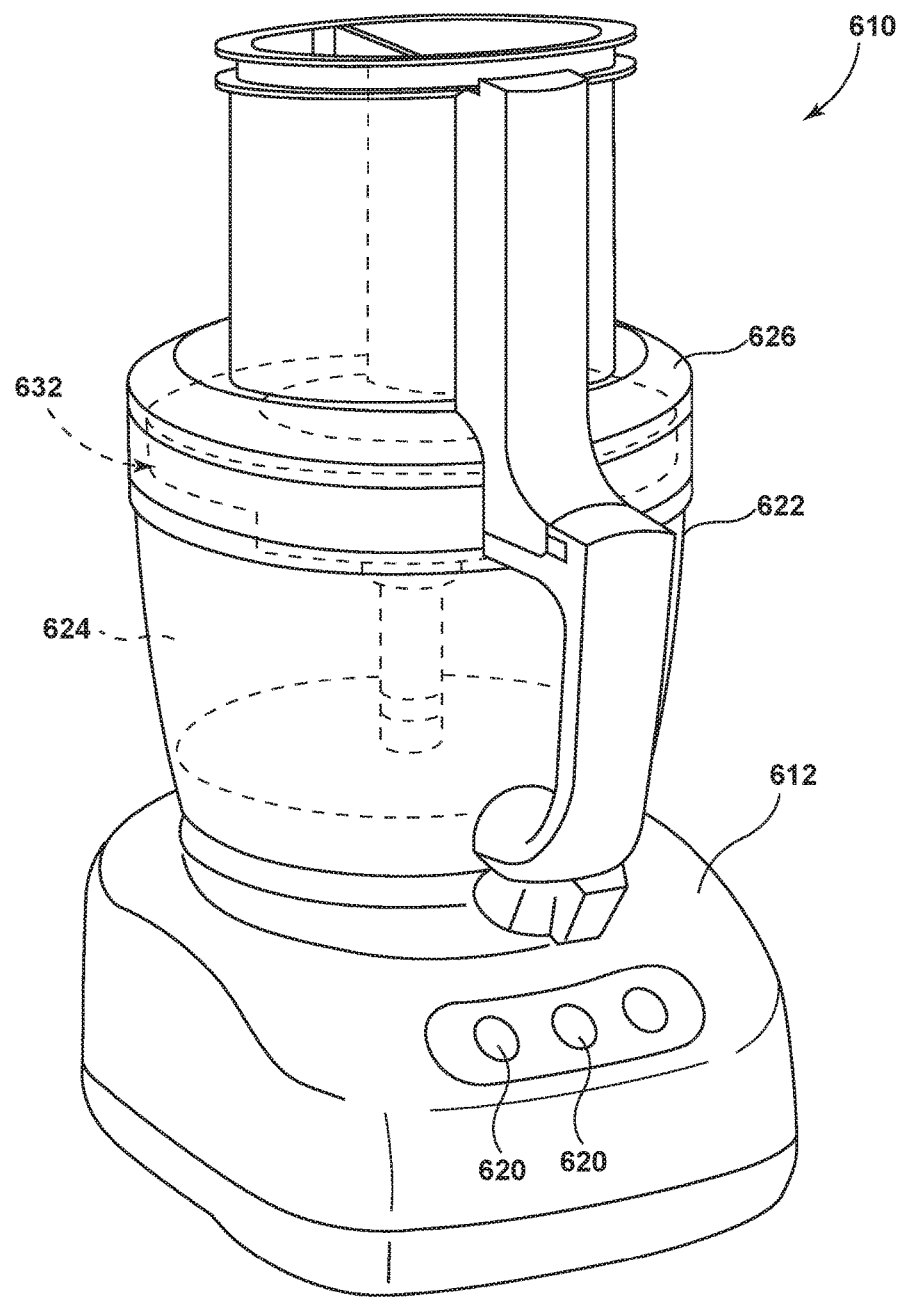
FIG. 17 is a perspective view of a food processor.

Referring to FIG. 17, a food processing device or food processor 610 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 610 has a base 612 that houses a motor 614 (shown schematically in FIG. 18) and a control unit (not shown). Under the control of the control unit, the motor's output shaft 616 drives a cutting blade 618 (see FIG. 18) to cut food items such as cheeses, meats, fruits, and vegetables. The base 612 also includes one or more buttons, switches, dials, or other types of controls 620. A user operates the controls 620 to control the operation of the motor 614 and hence the food processor 610. For instance, one of the controls 620 may be operable to turn the motor 614 on and off, while another control 620 may change the motor's speed.

As will be understood by those skilled in the art, the control unit may comprise analog and/or digital circuitry to process electrical signals received from the motor 614 (or other components of the food processor 610) and provide electrical control signals to the motor or other components of the food processor 610. For example, the control unit may be embodied as a microcontroller that executes firmware routines to control the operation of the food processor 610.

A removable bowl 622 is secured to the base 612. The bowl's handle facilitates placement of the bowl 622 on the base 612. The bowl 622 includes a removable lid 626 secured to its upper peripheral edge. The lid 626 has a feed tube 628 formed thereon through which food items such as fruits and vegetables are inserted into the bowl 622 to be processed by the food processor 610. Collectively, the lid 626 and the bowl 622 define a processing chamber 624 where food items are processed by the cutting blade 618.

The bowl 622, lid 626, and feed tube 628 are generally made of a transparent or translucent plastic material, so that the contents of the food processor 610 can be viewed by a user without removing the lid 626 from the bowl 622. Moreover, one or more locking mechanisms may be used to lock the bowl to the base 612 and the lid 626 to the bowl 622.

Figure 18:
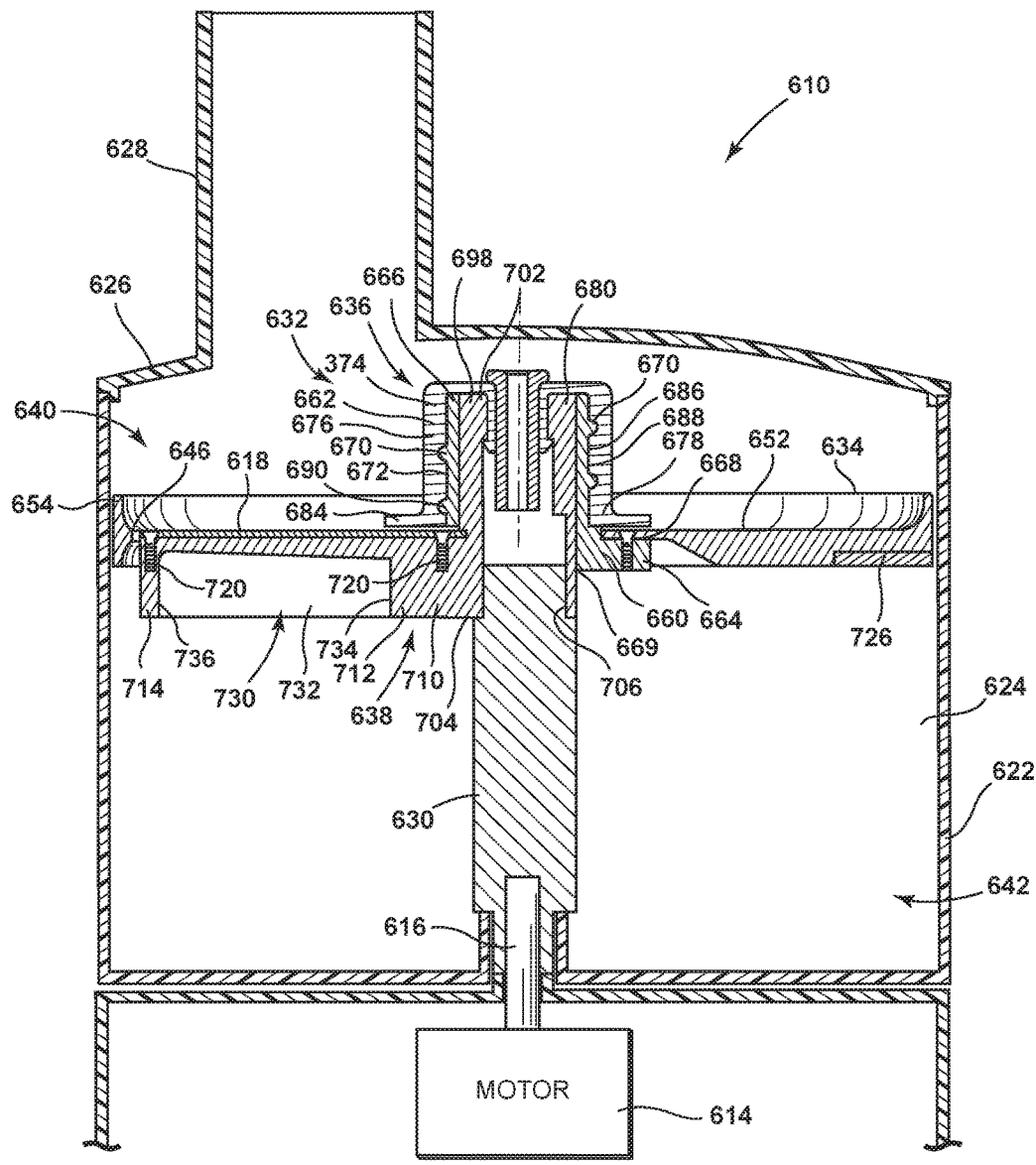
FIG. 18 is a partial cross-sectional view of the food processor of FIG. 17.
Figure 19:
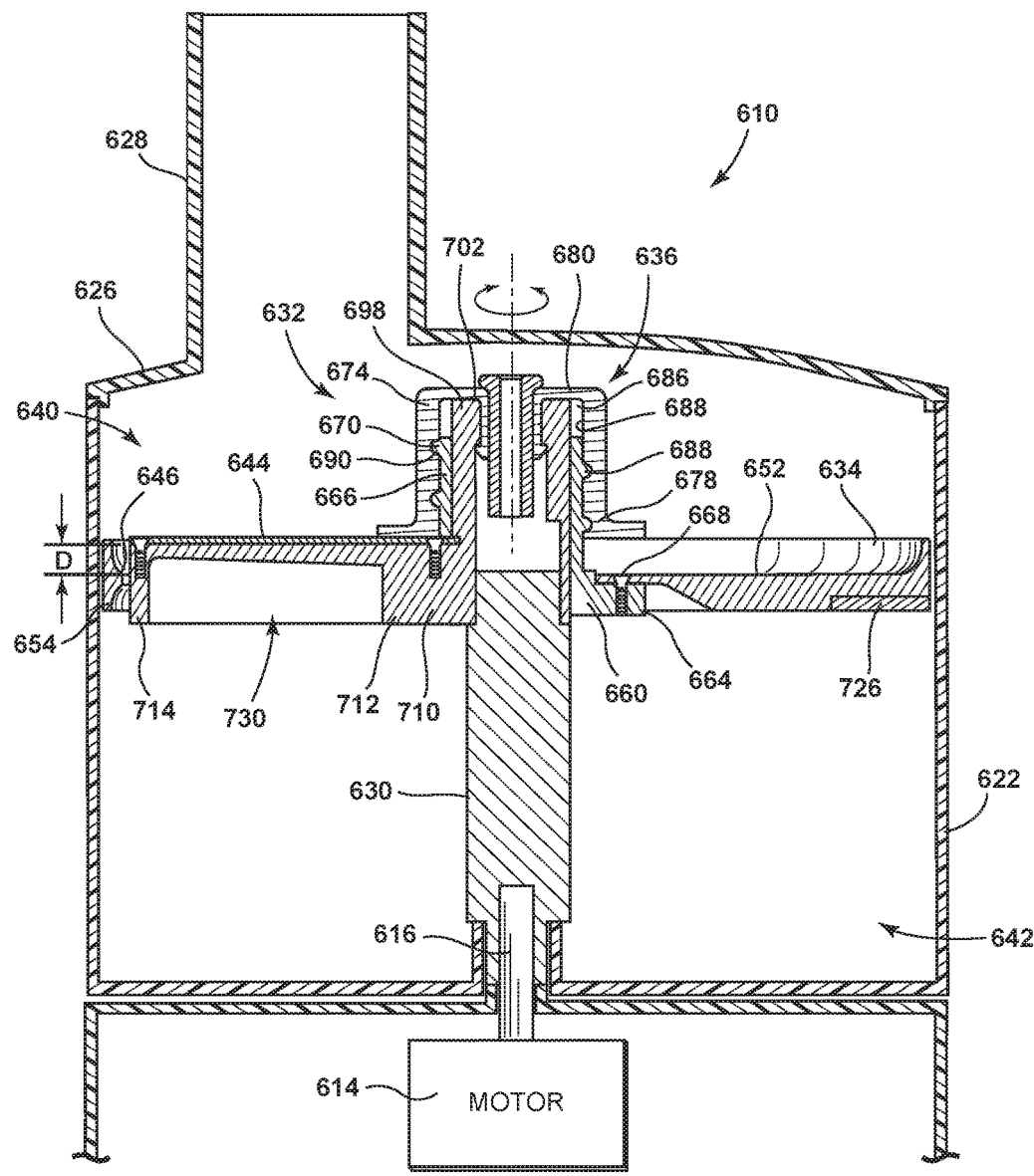
FIG. 19 is a view similar to FIG. 18, showing the rotating disk of the food slicer assembly in another position relative to the cutting blade.
Figure 20:
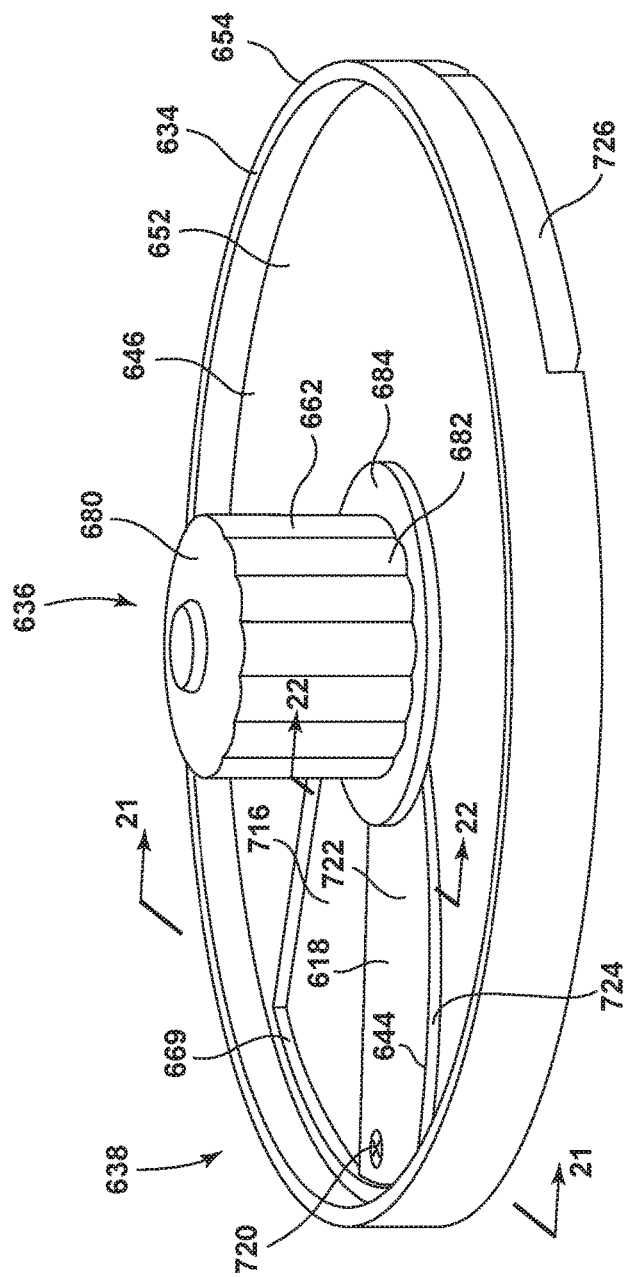
FIG. 20 is a perspective view of a food slicer assembly of the food processor of FIG. 17.

As shown in FIGS. 18 and 19, when the removable bowl 622 is secured to the base 612, the output shaft 616 of the motor 614 is coupled to a drive stem 630. The drive stem 630 is in turn coupled to a food slicer assembly 632. As shown in FIGS. 18-20, the food slicer assembly 632 includes a rotating disk 634, a thickness adjustment assembly 636, and a blade assembly 638, with the cutting blade 618 being one component thereof. The rotating disk 634 effectively divides the processing chamber 624 into an upper compartment 640 located between the disk 634 and the lid 626, and a lower compartment 642 located below the rotating disk 634. A vertical distance, D, between the cutting edge 644 of the cutting blade 618 and the upper surface 646 of the rotating disk 634 defines a cutting thickness. In other words, the thickness of the pieces of food items cut by the food processor 610 is determined by the distance D between the cutting edge 644 of the cutting blade 618 and the upper surface 646 of the rotating disk 634. When the distance D between the cutting edge 644 of the cutting blade 618 and the upper surface 646 of the rotating disk 634 is increased, thicker pieces of food items are created, with thinner pieces of food items being created when the distance D between the cutting edge 644 of the cutting blade 618 and the upper surface 646 of the rotating disk 634 is decreased.

The rotating disk 634 includes a planar body 652 and a rim 654 that extends upwardly from the outer perimeter of the planar body 652. The rotating disk 634 has a diameter that is slightly less than the inner diameter of the bowl 622 such that the rim 654 is positioned adjacent to, but spaced slightly apart from, the inner wall of the bowl to permit rotation of the disk 634 within the bowl 622. In the exemplary embodiment described herein, the rotating disk 634 is embodied as a monolithic structure (e.g., a single molded or cast part). However, it should be appreciated that the components of the rotating disk 634 (e.g., body 652 and rim 654) may be embodied as separate components secured to one another by an adhesive or other suitable fastener.

The thickness adjustment assembly 636 is operable by a user to vary the cutting thickness of the food processor 610 thereby creating thicker or thinner pieces of cut food items. The adjustment assembly 636 includes a hub 660 and a user-operated control device 662. The hub 660 includes a base 664 and a hollow sleeve 666 extending upwardly therefrom. A number of fasteners 668 (i.e., screws) extend through the planar body 652 into the base 664, thereby rigidly securing the rotating disk 634 to the hub 660. It will be appreciated that in other embodiments the hub 660 and the rotating disk 634 may be integrally formed as a monolithic structure. As shown in FIGS. 18 and 19, the sleeve 666 extends through an opening 669 formed in the planar body 652. External threads 670 are defined on a portion of an outer surface 672 of the sleeve 666.

The user-operated control device 662 is positioned above the upper surface 646 of the rotating disk 634. As shown in FIGS. 18-20, the user-operated control device 662 includes a control knob 674. The control knob 674 has a body 676 that extends from a lower end 678 to an upper end 680. The body 676 includes a knurled grip 682 formed in the upper end 680 and an annular flange 684 extending outwardly from the lower end 678. It should be appreciated that other user-activated control devices, such as levers, dials, buttons, or the like, may be substituted for the control knob.

As shown in FIGS. 18 and 19, the body 676 of the control knob 674 has an aperture 686 formed in the lower end 678 that receives the sleeve 666 of the hub 660. The inner surface 688 of the aperture 686 has internal threads 690 defined therein that correspond to the external threads 670 of the hub 660. The internal threads 690 of the control knob 674 threadingly engage the external threads 670 of the hub 660 to move the hub 660 (and hence the rotating disk 634) upwardly and downwardly relative to the cutting blade 618. For example, clockwise rotation of the control knob 674 causes upward movement of the hub 660 (and hence the rotating disk 634), while counter-clockwise rotation of the control knob 674 causes downward movement of the hub 660 (and hence the rotating disk 634).

As shown in FIGS. 18 and 19, a central shaft 698 of the blade assembly 638 is received in the hollow sleeve 666 of the adjustment assembly 636 and is secured at an upper end 702 to the control knob 674. The central shaft 698 extends from the upper end 702 to a lower end 704, which is has an opening 706 that receives the drive stem 630. In that way, the slicer assembly 632 is coupled to the output shaft 616 such that the slicer assembly 632 may be driven by the motor 614. The blade assembly 638 also includes a mounting arm 710 extending from an inner end 712, which is secured to the lower end 704 of the central shaft 698, to an outer end 714, which is positioned adjacent to the rim 654 of the rotating disk 634. In the illustrative embodiment, the central shaft 698 and mounting arm 710 are formed as a single monolithic component from a plastic or metallic material. It should be appreciated that in other embodiments the shaft 698 and arm 710 may be formed as separate components that are joined during final assembly by an adhesive or other suitable fastener.

The cutting blade 618 is secured to an upper surface 716 of the mounting arm 710. A number of fasteners 720 (i.e., screws) positioned at a rear edge 722 of the cutting blade 618 extend into the mounting arm 710, thereby rigidly securing the cutting blade 618 to the mounting arm 710. It will be appreciated that in other embodiments the fasteners 720 may take the form of T-stakes, pins, posts, or other structures capable of securing the cutting blade 618 to the mounting arm 710. Additionally, the mounting arm 710 may include an overmold that receives the cutting blade 618.

Figure 21:
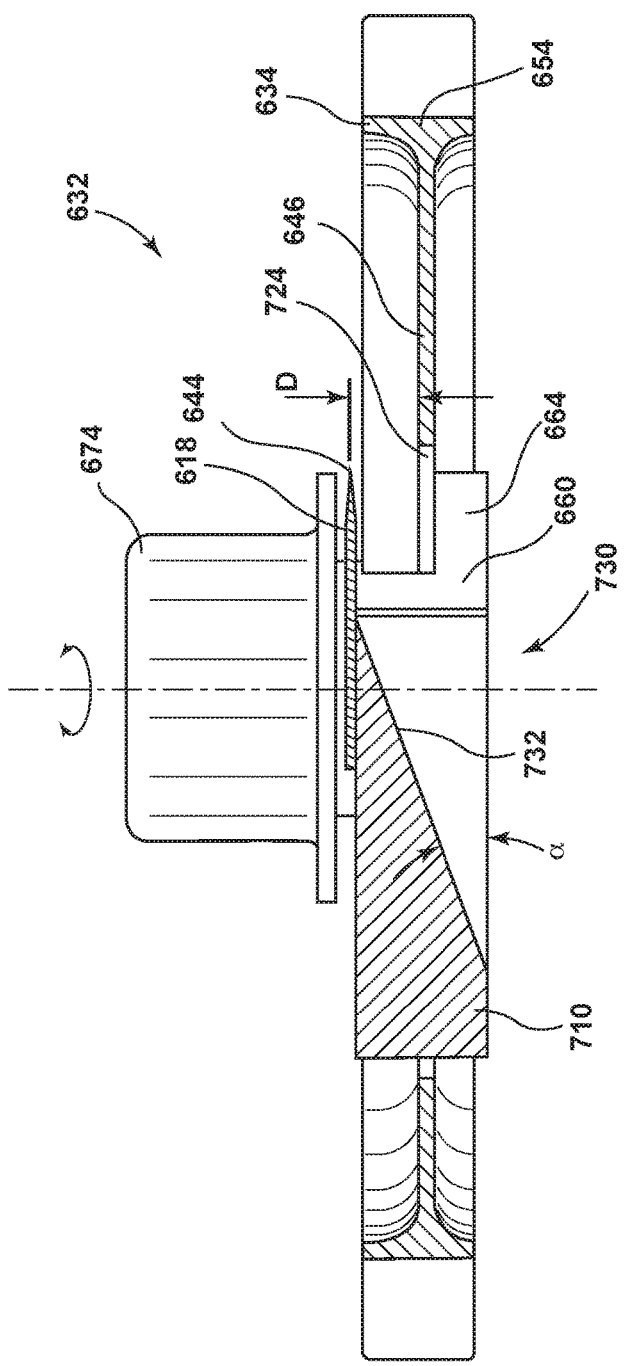
FIG. 21 is a partial cross-sectional view of the food slicer assembly of FIG. 20 taken along the line 21-21.

As shown in FIG. 20, the opening 669 formed in the planar body 652 extends radially outward and receives the mounting arm 710 and the cutting blade 618. When the food slicer assembly 632 is assembled, a gap or throat 724 is defined between the cutting edge 644 and the body 652, as best seen in FIGS. 20 and 21. The food slicer assembly 632 also includes a counterweight 726 coupled to the planar body 652 adjacent to the outer perimeter of the rotating disk 634. As shown in FIGS. 18 and 19, the hub 660 is positioned between the counterweight 726 and the cutting blade 618. The counterweight 726 is sized to offset the weight of the mounting arm 710 and the cutting blade 618. In that way, the counterweight 726 balances the slicer assembly 632 as it is rotated. In other embodiments, the separate counterweight 726 may be omitted and additional material may be added to the rim 654 and the planar body 652 such that the counterweight is incorporated into the rotating disk 634.

During operation, the user may change the cutting position of the rotating disk 634 using the control knob 674. When the control knob 674 is rotated, the hub 660 translates upwardly and downwardly along the central shaft 698 to change the thickness of the food items being processed by the food processor 610. In particular, counter-clockwise rotation of the control knob 674 causes downward movement of the hub 660 (and hence rotating disk 634), which increases the distance D between the cutting edge 644 of the cutting blade 618 and the upper surface 646 of the rotating disk 634 and thereby produces thicker pieces of food items. Oppositely, when the control knob 674 is rotated clockwise, the hub 660 is moved upwardly along the central shaft 698 and the distance D between the cutting edge 644 of the cutting blade 618 and the upper surface 646 of the rotating disk 634 is decreased, thereby producing thinner pieces of food items.

When the food processor 610 is activated, the motor 614 causes the blade assembly 638 to rotate. The blade assembly 638 acts on the hub 660 secured to the rotating disk 634 such that the rotating disk 634 and the blade assembly 638 rotate together. Food items inserted through the feed tube 628 are urged into contact with the upper surface 646 of the rotating disk 634 while being acted upon (i.e., cut) by the cutting blade 618. Cut food items, along with other food items small enough to fit within the throat 724, pass from the upper compartment 640 through the throat 724.

A ramp 730 defined in the mounting arm 710 guides food items from the upper compartment 640 to the lower compartment 642. As shown in FIG. 21, the ramp 730 is positioned adjacent to and below the cutting blade 618 and includes an inclined surface 732 extending downwardly from the underside of cutting blade 618. The inclined surface 732 extends from the inner end 712 of the mounting arm 710 radially outward to the outer end 714 of the mounting arm 710. As shown in FIGS. 18 and 19, the inner end 712 defines an inner sidewall 734 for the ramp 730, while the outer end 714 of the mounting arm 710 defines an outer sidewall 736. In that way, the inclined surface 732 is encapsulated or captured between the sidewalls 734, 736, thereby reducing the potential for food items to travel outside of the processing path and thus reducing unwanted debris.

Figure 22:
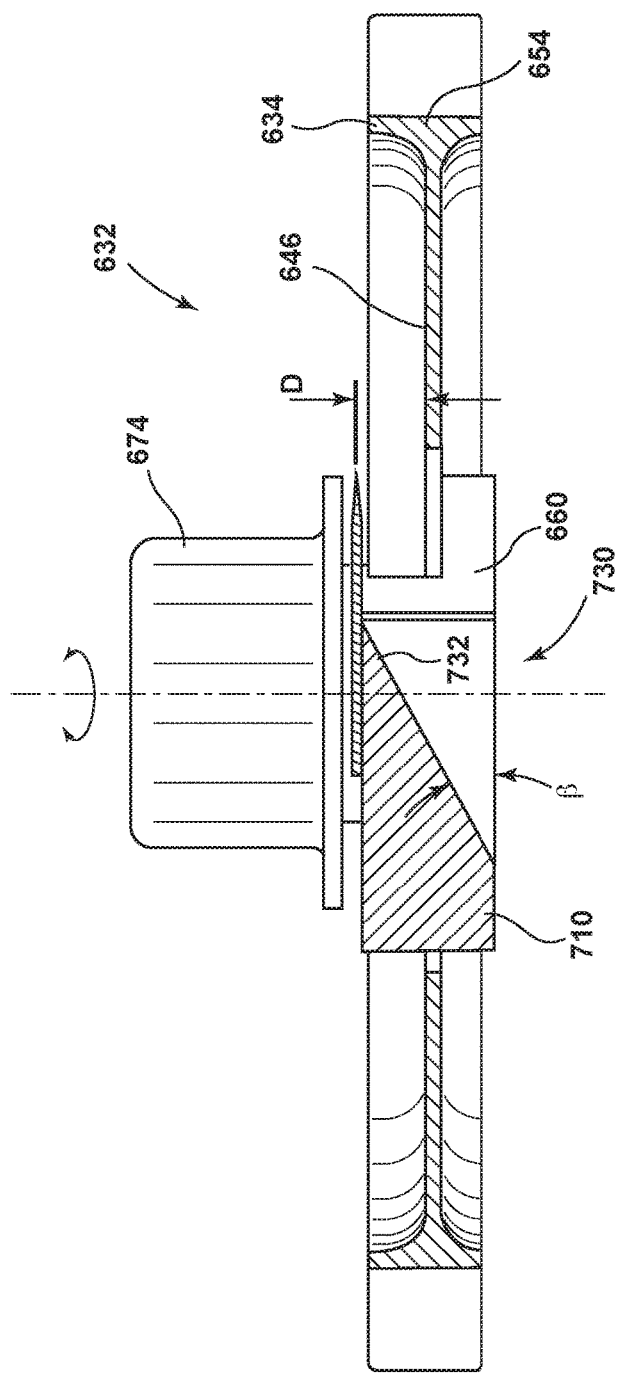
FIG. 22 is a partial cross-sectional view of the food slicer assembly of FIG. 20 taken along the line 22-22 showing the angle of inclination of the ramp.

As shown in FIGS. 21 and 22, the slope or angle of the inclined surface 732 relative to the cutting blade 618 changes as the inclined surface 732 extends radially outward. As shown in FIG. 21, which is a cross-section of the slicer assembly 632 taken at the outer end 714 of the mounting arm 710, the inclined surface 732 has an angle of inclination α at the outer end 714. As shown in FIG. 22, which is a cross-section of the slicer assembly 632 taken at the inner end 712 of the mounting arm 710, the inclined surface 732 has an angle of inclination β that is greater than the angle α. In the illustrative embodiment, the angle α is approximately 15 degrees, and the angle β is approximately 25 degrees. It will be appreciated that in other embodiments the angles α, β may be greater than or less than those of the illustrative embodiment. Additionally, in some embodiments, the angles α, β may be equal. In still other embodiments, the inclined surface 732 may be convex or concave in one or more directions.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processing device 610 is herein illustrated as a conventional domestic food processor, the features and aspects disclosed herein can also be implemented in other types of food processing devices such as automatic food slicers, dicers, ice shavers and the like. Similarly, in other embodiments, the rotating disk could be directly coupled to motor, and the blade could be moveable relative to the rotating disk.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
a base having a motor positioned therein;
a removable bowl coupled to the base;
a removable lid coupled to the bowl so as to define a processing chamber, the lid having a feed tube that opens into the bowl;
a cutting blade positioned in the bowl and driven by the motor to cut food items advanced through the feed tube;
a rotating disk at least a portion of which is upwardly and downwardly movable relative to the cutting blade to adjust the distance therebetween, the rotating disk dividing the processing chamber into an upper compartment and a lower compartment;
a ramp positioned below the cutting blade to guide food items from the upper compartment into the lower compartment; and
an adjustment assembly operable to move at least the moveable portion of the rotating disk relative to the cutting blade, the adjustment assembly including a user-operated control device that is movable by a user to adjust the distance, and wherein the adjustment assembly is configured to retain at least the moveable portion of the rotating disk at any one of a plurality of non-equal vertical positions relative to the cutting blade, and to prevent upward and downward movement of at least the moveable portion of the rotating disk from at least two of the non-equal vertical positions relative to the cutting blade when the food processor is being used to cut food items.

2. The food processor of claim 1, wherein:
the user-operated control device is a control knob.

3. The food processor of claim 1, wherein:
the user-operated control device is positioned above the rotating disk.

4. The food processor of claim 1, wherein:
substantially the entire disk is movable relative to the cutting blade.

5. The food processor of claim 1, wherein:
the rotating disk comprises a single molded part.

6. The food processor of claim 1, wherein:
the rotating disk comprises separate components that are coupled to one another.

7. The food processor of claim 6, wherein:
the rotating disk comprises separate components that are secured to one another.

8. The food processor of claim 1, wherein:
the ramp has a surface extending outwardly in a radial direction from a first end to a second end, the surface having a first angle of inclination at the first end that is greater than or equal to a second angle of inclination at a second end.

9. The food processor of claim 8, wherein:
the first angle of inclination at the first end is equal to the second angle of inclination at the second end.

10. The food processor of claim 1, including:
a mounting arm positioned below the cutting blade.

11. The food processor of claim 10, wherein:
the cutting blade is secured to an upper surface of the mounting arm.

12. The food processor of claim 10, wherein:
the rotating disk defines an opening; and:
the mounting arm is received in the opening.

13. The food processor of claim 12, wherein:
the opening defined by the rotating disk extends radially outward.

14. The food processor of claim 1, wherein:
the user-operated control device comprises a rotatable member that is operably connected to the disk such that rotation of the user-operated control device relative to the rotating disk moves at least the movable portion of the rotating disk relative to the cutting blade.

15. The food processor of claim 14, wherein:
the rotating disk includes a threaded hub;
the rotatable member includes threads that threadably engage the threaded hub.

16. The food processor of claim 14, wherein:
the threaded hub includes external threads;
the rotatable member comprises a knob having internal threads.

17. A food processor comprising:
a base having a motor positioned therein;
a removable bowl coupled to the base;
a removable lid coupled to the bowl so as to define a processing chamber, the lid having a feed tube that opens into the bowl;
a cutting blade positioned in the bowl and driven by the motor to cut food items advanced through the feed tube;
a rotating disk at least a portion of which is upwardly and downwardly movable relative to the cutting blade to adjust the distance therebetween, the rotating disk dividing the processing chamber into an upper compartment and a lower compartment;
a ramp positioned below the cutting blade to guide food items from the upper compartment into the lower compartment;
an adjustment assembly operable to move at least the moveable portion of the rotating disk relative to the cutting blade, the adjustment assembly including a user-operated control device that is movable by a user to adjust the distance, and wherein the adjustment assembly is configured to retain at least the moveable portion of the rotating disk at any one of a plurality of non-equal vertical positions relative to the cutting blade, and to prevent upward and downward movement of at least the moveable portion of the rotating disk from any one of the non-equal vertical positions relative to the cutting blade when the food processor is being used to cut food items; and wherein
the user-operated control device includes (i) an internally-threaded control knob coupled to the blade and (ii) an externally threaded sleeve coupled to the rotating disk and positioned in the control knob, and wherein rotation of the control knob in a first direction causes upward movement of the rotating disk, and rotation of the control knob in a second direction causes downward movement of the rotating disk.

18. A food processor comprising:
a base having a motor positioned therein;
a removable bowl coupled to the base;
a removable lid coupled to the bowl so as to define a processing chamber, the lid having a feed tube that opens into the bowl;
a cutting blade positioned in the bowl and driven by the motor to cut food items advanced through the feed tube;
a rotating disk at least a portion of which is upwardly and downwardly movable relative to the cutting blade to adjust the distance therebetween, the rotating disk dividing the processing chamber into an upper compartment and a lower compartment;
a ramp positioned below the cutting blade to guide food items from the upper compartment into the lower compartment;
an adjustment assembly operable to move at least the moveable portion of the rotating disk relative to the cutting blade, the adjustment assembly including a user-operated control device that is movable by a user to adjust the distance, and wherein the adjustment assembly is configured to retain at least the moveable portion of the rotating disk at any one of a plurality of non-equal vertical positions relative to the cutting blade, and to prevent upward and downward movement of at least the moveable portion of the rotating disk from any one of the non-equal vertical positions relative to the cutting blade when the food processor is being used to cut food items; and wherein
the user-operated control device comprises a user-operated pin that is movable between (i) a first position in which the rotating member is prevented from moving upwardly and downwardly relative to the cutting blade, and (ii) a second position in which the rotating member is permitted to move upwardly and downwardly relative to the cutting blade, and wherein the rotating member includes a sleeve extending downwardly from a lower surface thereof, the sidewall of the sleeve including a first plurality of teeth, and wherein an outer surface of the pin has a second plurality of teeth extending therefrom and wherein a number of the first plurality of teeth are engaged with the second plurality of teeth when the user-operated pin is in the first position.

* * * * *